US007563362B2

(12) United States Patent  (10) Patent No.: US 7,563,362 B2
Jeong  (45) Date of Patent: Jul. 21, 2009

(54) AUTO-REGENERABLE HOT AND COLD WATER SOFTENER

(75) Inventor: Seung-Hoon Jeong, Incheon (KR)

(73) Assignee: Seung Gwang Co., Ltd., Incheon (KR)

(*) Notice: Subject to any disclaimer, the term of this patent is extended or adjusted under 35 U.S.C. 154(b) by 452 days.

(21) Appl. No.: 10/575,351

(22) PCT Filed: Nov. 8, 2004

(86) PCT No.: PCT/KR2004/002881

§ 371 (c)(1),
(2), (4) Date: Apr. 11, 2006

(87) PCT Pub. No.: WO2005/044736

PCT Pub. Date: May 19, 2005

(65) Prior Publication Data

US 2007/0045191 A1  Mar. 1, 2007

(30) Foreign Application Priority Data

Nov. 7, 2003  (KR) .................. 10-2003-0078795
Mar. 5, 2004  (KR) .................. 10-2004-0015193
Mar. 5, 2004  (KR) .................. 10-2004-0015196

(51) Int. Cl.
*B01D 24/46* (2006.01)
*B01D 24/48* (2006.01)

(52) U.S. Cl. ............... 210/143; 210/149; 210/190; 210/264; 210/269; 210/424

(58) Field of Classification Search ............ 210/143, 210/149, 190, 264, 269, 424
See application file for complete search history.

(56) References Cited

U.S. PATENT DOCUMENTS 6,214,214 B1 *  4/2001  Hansen et al. ............ 210/106
7,285,220 B2 * 10/2007  Jeong et al. .............. 210/670

* cited by examiner

*Primary Examiner*—Matthew O Savage
(74) *Attorney, Agent, or Firm*—Egbert Law Offices PLLC

(57) ABSTRACT

The automatic regenerable cold/hot water softener includes a water softening tank having ion exchange resin and a regenerating tank filled with regenerating substance of the ion exchange resin. The water softener controls the mode for receiving raw water and discharging soft water using one switching valve, a direct water mode for discharging raw water itself, a regeneration mode for regenerating ion exchange resin, and a intermittence mode for intermitting the inflow and outflow of the raw water and the soft water. The precise regeneration time is judged according to used amount of the soft water by a temperature sensor and a flow meter for sensing temperature and flux of supply raw water. The regeneration is automatically prosecuted by a control part having a microprocessor. The cold/hot water softener serves a user's convenience in that sudden change of temperature is prevented.

10 Claims, 24 Drawing Sheets

AUTO-REGENERABLE HOT AND COLD WATER SOFTENER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a cold/hot water softener having functions of subdivision of temperature and automatic regeneration, and more particularly to an automatic regenerable cold/hot water softener for controlling respectively a water softening mode for discharging soft water using one switching valve, a regeneration mode for regenerating ion exchange resin, a direct water mode for discharging raw water itself, and a intermittence mode for intermitting raw water and the inflow and outflow of the soft water, regenerating automatically ion exchange resin without special additional manipulation by automatically sensing the regeneration time of the ion exchange resin according the used amount of raw water, and automatically discharging soft water having cold temperature and subdivided temperature, thereby serving a user's convenience.

BACKGROUND OF THE INVENTION

Typically, the principle of a water softener is to soften water by substituting $Na^+$ ion for $Ca^+$ ion and $Mg^{2+}$ ion contained in hard water. The typical softener includes essentially a water softening tank containing ion exchange resins of special highly polymerized compound, and a regenerating tank in which is filled with regenerating substance of ion exchange resins such as salt, etc., for regenerating $Na^+$ ion when dissolved in water.

As shown in a block piping laying diagram of FIG. 1, a conventional typical cold/hot water softener includes a cold regenerating tank 2a, a cold water softening tank 4a connected to the cold regenerating tank, a hot regenerating tank 2b, a hot water softening tank 4b connected to the hot regenerating tank, and a plurality of valves V1, V2, V3, V4, V5, V6. The cold/hot water softening tanks 4a, 4b usually contain an ion exchange resin containing Na+ ion, and salt is filled in each of cold/hot regenerating tanks 2a, 2b only when regenerating.

Thus, upon using soft water, cold raw water low than normal temperature is supplied through the empty cold regenerating tank 2a into the cold water softening tank 4a, and the resulted cold soft water is discharged outside while hot raw water high than normal temperature is supplied through the empty hot regenerating tank 2b into the hot water softening tank 4b, and the resulted hot soft water is discharged outside.

In addition, the existing cold/hot water softener is provided with a plurality of valves in order to control inflow and outflow of raw water and soft water. First and second valves V1, V2 are provided with front ends of cold/hot regenerating tanks 2a, 2b, respectively, for regulating on/off of supply of cold/hot raw water. Third and fourth valves V3, V4 are provided with rear ends of cold/hot water softening tanks 4a, 4b, respectively, for regulating on/off of discharge of cold/hot soft water.

Thus, a user can use water as desired by opening first and second valves V1, V2 and controlling third and fourth valves V3, V4 suitably. Then, the third and fourth valves V3, V4 can be exchanged with typical water links.

Meanwhile, if a water softener is used for a long time, $Na^+$ ion contained in ion exchange resins will be exhausted. Thus, for regenerating $Na^+$ ion, each of the cold/hot regenerating tanks 2a, 2b are filled with salt. Then, the cold/hot regenerating tanks 2a, 2b can be opened with typical stoppers provided therein and have fifth and sixth valves V5, V6 for discharging remaining raw water contained therein.

In order to regenerate ion exchange resins, the first to fourth valves V1, V2, V3, V4 are all closed, the fifth and sixth valves V5, V6 are opened, the remaining raw water contained therein is discharged, and then, salt is filled into each of the cold/hot regenerating tanks 2a, 2b. Thereafter, the first and second valves V1, V2 are opened, raw water is supplied to the cold/hot regenerating tanks 2a, 2b, and the regenerating water in which $Na^+$ ion is dissolved is flowed into each of the cold/hot water softening tanks 4a, 4b, respectively. Accordingly, the ion exchange resins can be regenerated.

Thereafter, the third and fourth valves V3, V4 are opened, components contained salt are all eliminated, and then the regeneration is completed. Accordingly, soft water can be normally used.

However, the above-mentioned conventional cold/hot water softeners had several defects. Firstly, it was difficult to determine regeneration time of ion exchange resins contained in each of the cold/hot water softening tanks 4a, 4b, and thus, the determination thereof entirely depended on the feeling of a user. Consequently, the performance and length of life of ion exchange resins were considerably reduced due to the unnecessarily frequent regenerations or rare regeneration.

Secondly, as described above, because the procedures of regeneration of ion exchange resins was complicated too much in the conventional cold/hot water softeners, a long time of work was required even in the skilled person. In particular, because all of the procedures of regeneration should be operated directly by hand of a user every time, this caused a drawback with a very troublesome work.

Thirdly, because the plurality of valves V1, V2, V3, V4, V5, V6 were included for using the cold/hot water softener, the structure thereof was complicated, failures and malfunction are likely to be caused, and costs of production thereof was expensive.

BRIEF SUMMARY OF THE INVENTION

It is, therefore, an object of the invention is to provide a cold/hot water softener in which the aforementioned problems can be overcomed and which senses precise regeneration time according to the used amount of soft water and automatically regenerates ion exchange resins not to require a special manipulation by manpower.

Further, it is another object of the invention to provide an automatic regenerable cold/hot water softener for serving a user's convenience by preventing sudden change of temperature upon using the cold/hot soft water and using soft water having subdivided temperature, for decreasing the possibility of failure or malfunction of the water softener by consisting of simple constitution, and for allowing the user to conveniently use the water softener by minimizing the number of valve which the user should manipulate.

Further, it is another object of the invention to a cold/hot water softener having functions of the subdivision of temperature and automatic regeneration for serving a user's convenience so that the user freely selects desired temperature by the subdivision of temperature of discharging soft water, for reserving soft water without spending the soft water even if the soft water does not have desired temperature, thereby saving the water resources, and for maximizing the life of ion exchange resin and the water softener.

To achieve the above objects, an automatic regenerable cold/hot water softener of the invention comprises:

a water softening tank including at least two softening water regions formed along the vertical direction of length of the water softening tank to partition radially the inside of a cylindrical body, the water softening regions being filled with ion exchange resin, a valve region formed in an upper end of the water softening tank for joining the water softening regions to each other, and a water outlet region formed in a lower end of the water softening tank for joining the water softening regions;

a regenerating tank being filled with regenerating substance, the regenerating tank having a regenerating tank stopper for opening the inside thereof;

a raw water supply pipe for supply a raw water to the valve region, a regenerating raw water pipe and a regenerating water pipe connected to the upper end and the lower end of the regenerating tank, respectively, and a direct water pipe for connecting the valve region and the water outlet region;

a temperature sensor for sensing temperature of the raw water and a flow meter for finding the cumulative total of the supply amount of the raw water;

a switching valve built in the valve region for supplying raw water to one of selected from the water softening regions in a water softening mode, inducing raw water into the regenerating raw water pipe and then supplying regenerating water collected from the regenerating water pipe to each of the water softening regions in a regeneration mode, inducing raw water into the direct water pipe in a direct water mode, and shutting off the raw water supply pipe in an intermittent mode;

a valve driving part for controlling the operation of the switching valve; and a control part for distributing the raw water into each of the water softening regions according to temperature in the water softening mode based on the measured result of the temperature sensor, and controlling the valve driving part to change the intermittence mode into the regeneration mode based on the cumulative result of the flow meter.

The water softener further comprises a pre-processing filter is installed in the raw water supply pipe in a deposition method for filtering the raw water or an adsorption method using activated carbon.

Here, the switching valve includes:

a static disk fixed to close an upper end of each of the water softening regions, the static disk exposing soft water holes and regenerating water distribution holes communicated with the water softening regions, respectively, a regenerating raw water hole communicated with the regenerating raw water pipe, a regenerating water hole communicated with the regenerating water pipe, a direct water hole communicated with the direct water pipe, and a closed hole, on an upper surface thereof; and a rotary disk staked on the static disk, the rotary disk being rotated about a center axis projected upwardly, whereby, as the rotary disk is rotated, the rotary disk has a connecting opening for exposing one selected from the soft water holes to the valve region in the water softening mode, for exposing the regenerating raw water hole consisting of a plurality of fine holes to the valve region, and, simultaneously, interconnecting the regenerating water hole and the regenerating water distribution holes by trap groove in the regeneration mode, for exposing the direct water hole to the valve region in the direct water mode, and for exposing the closed hole to the valve region in the intermittence mode.

Here, the regenerating water hole is positioned eccentrically from the center of the static disk, the regenerating water distribution holes which has the same inner pressure as the soft water holes, respectively, being arranged along edges of the regenerating water hole, each of the soft water holes, the direct water hole, the regenerating raw water hole and the closed hole being arranged radically in turn along the edges of the static disk of the outside of the regenerating water hole and the regenerating water distribution hole and being maintained in equal distances from the center of the fixing disk.

Here, the raw water supply pipe is connected to the side of the valve region, the regenerating water pipe is extended from the lower end of the regenerating tank and then is passed through the side of the lower end of the regenerating tank and then is connected to the rear surface of the static disk while built along the direction of length, and the direct water pipe is extended from the rear surface of the static disk and then is connected to the water outlet region while built in along the direction of length of the regenerating tank.

The water softener further comprises an enlarged groove for enlarging each upper end of the soft water holes to be adjacent to neighboring soft water holes.

Here, the valve driving part includes: a power means having a rotation shaft; a motor gear fixed to the rotation shaft with a center thereof being penetrated by the rotation shaft; a main gear engaged with the motor gear with a center thereof being penetrated and fixed by the center axis of the rotary disk; and a position plate having numerous discrimination marks along edge thereof, a center of the position plate being penetrated by the center axis of the rotary disk.

Here, the control part includes: a position detecting sensor for finding the degree of rotation of the rotary disk by sensing discrimination marks; and a logical operation device for controlling rotating direction and angle of the rotation shaft based on the position sensor, the temperature sensor and the flow meter.

The water softener further comprises: an agitating means installed within the regenerating tank; a water level detecting sensor for sensing a level of the regenerating water within the regenerating tank; and a discharging valve which is installed passing through the bottom surface of the regenerating tank and which is opened and closed by the water lever detecting sensor to constantly maintain the level of the regenerating water.

BRIEF DESCRIPTION OF THE SEVERAL VIEWS OF THE DRAWINGS

The above and other objects and features of the invention will become apparent from the following description of preferred embodiments taken in conjunction with the accompanying drawings.

DETAILED DESCRIPTION OF THE INVENTION

The specific construction and principle of working of the present invention will be described in detail below with reference to the accompanying drawings.

Figure 1:
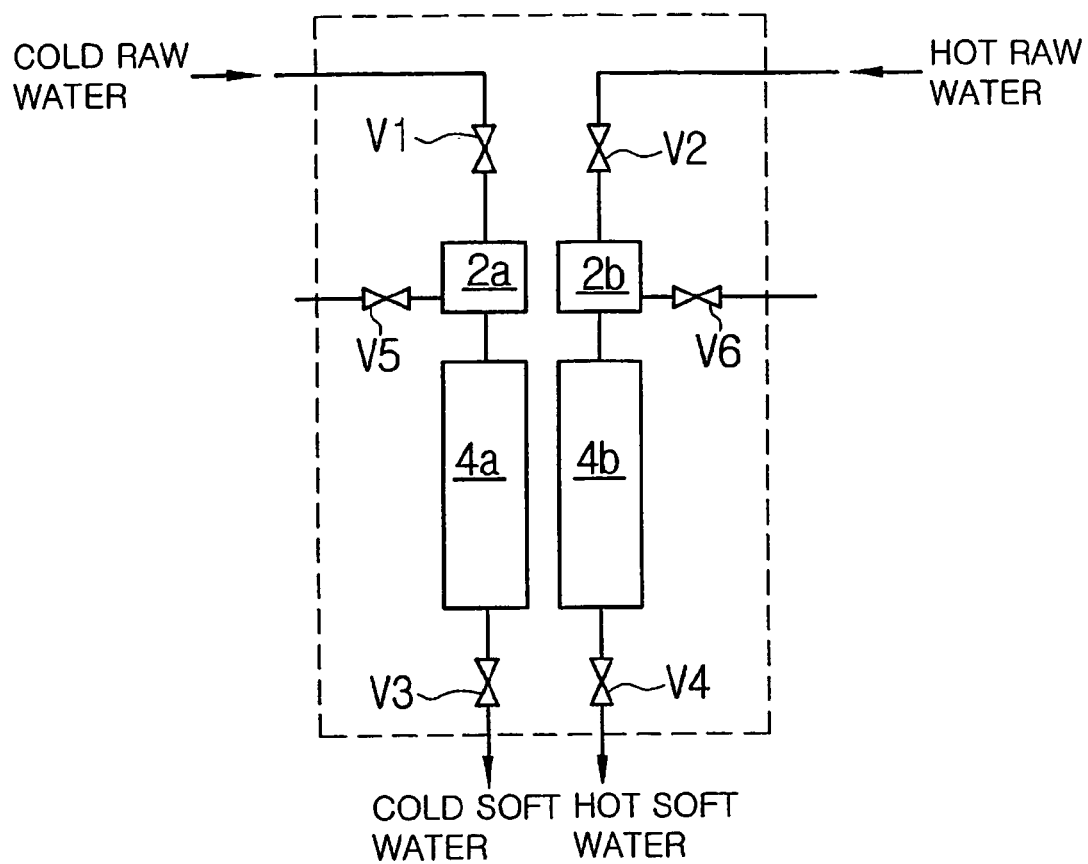
FIG. 1 is a schematic view of a block piping laying diagram showing briefly a conventional cold/hot water softener.
Figure 2:
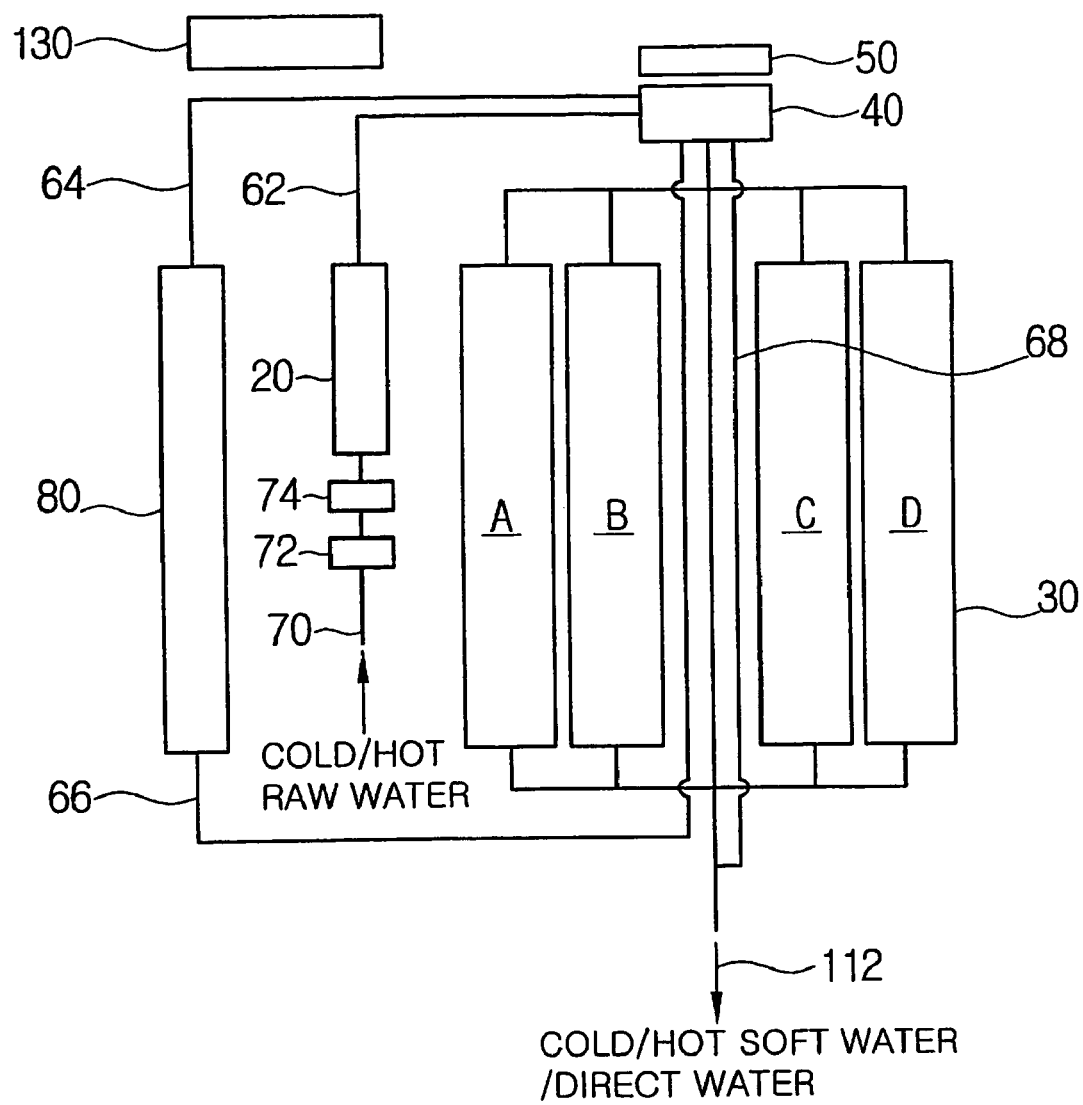
FIG. 2 is a schematic view of a block piping laying diagram showing briefly a cold/hot water softener according to a basic embodiment of the invention.

FIG. 2 is a block piping laying diagram showing briefly an automatic regenerable cold/hot water softener (hereinafter, it will be referred to "a cold/hot water softener") according to a basic embodiment of the present invention. The cold/hot water softener includes a water softening tank 30 in which an ion exchange resin is contained, a regenerating tank 80 in which salt, etc., as regenerating substances of the ion exchange resin is filled, a plurality of pipes 62, 64, 66, 68 comprised of moving paths of fluid of raw water, soft water or regenerating water, etc., and a switching valve 40 for controlling flow of the fluid moved through each of the pipes.

Furthermore, the cold/hot water softener according to the present invention includes a temperature sensor 72 and a flow meter 74 for metering temperature and flux of raw cold/hot water supplied from an outside, a valve drive part 50 for controlling an operation of the switching valve 40, and a control part for controlling the valve drive part depending on the results of metering of the temperature sensor 72 and the flow meter 74.

If described more specifically, the inside of the water softening tank 30 is divided and defined by at least two or more water softening regions, more preferably four water softening regions A, B, C, D. The ion exchange resin of special highly polymerized compound containing $Na^+$ ion and having a low swelling is filled in each region of the water softening tank, and each region is supplied with raw water having different temperature, respectively, and then makes the raw water to be changed with soft water separately.

Then, regenerating substance such as salt, etc. is always filled in the inside of the regenerating tank 80. The regenerating tank 80 is supplied with raw water in which $Na^+$ ion is dissolved and the regenerating water is produced. The regenerating water provides the ion exchange resin with $Na^+$ ion and regenerates it.

In addition, the plurality of the pipes includes a raw water supply pipe 62 for supplying raw water flowed from a water inlet 70 to the switching valve 40, a regenerating raw water pipe 64 connecting the switching valve 40 and the regenerating tank for supplying raw water to a regenerating tank 80, a regenerating water pipe 66 connecting the regenerating tank 80 and the switching valve 40 for supplying the regenerating water to the switching valve 40, and a direct water pipe 68 for discharging raw water itself directly supplied to the switching valve 40 through a water outlet 112.

Each of the water softening regions A, B, C, D of the regenerating tank 80 is connected to the switching valve 40 and the water outlet 112. Then, a pre-processing filter for dividing impurities from raw water can be installed in the raw water supply pipe 62 in a deposition method or adsorption method using activated carbon.

The temperature sensor 72 and flow meter 74 are positioned in the water inlet 70 of the raw water supply pipe 62 for accumulating and metering temperature and total flux of the cold/hot raw water. The control part 130 controls the valve drive part 50 depending on the algorithm previously stored based on the results of sensing of the temperature sensor 72 and flow meter 74.

Hence, the switching valve 40 performs the following four operations. These comprises an operation of directing raw water of each of the raw water supply pipe 62 to one of the water softening regions A, B, C, D of water softening tank 30 and then discharging the soft water from the water outlet 112, an operation of directing raw water of each of the raw water supply pipe 62 to the regenerating raw water pipe 64, supplying the raw water to the regenerating tank 80, supplying the regenerating water returned through the regenerating water pipe 66 to each of the water softening regions A, B, C, D, and regenerating the ion exchange resin, an operation of directing raw water of each of the raw water supply pipe 62 to the direct water pipe 68, and discharging the raw water flowed directly from the water outlet 112, and an operation of preventing supply of the raw water and discharge of the soft water by closing the raw water supply pipe 62.

The four operations carried out by the control of the switching valve 40 correspond to operation modes of the cold/hot water softener according to the present invention. These comprise a water softening mode of discharging soft water respectively through the water outlet 112, a regeneration mode of regenerating the ion exchange resin of the water softening tank 30, a direct water mode of discharging the direct water as raw water itself, and an intermittence mode of stopping all the flow of fluid in the cold/hot water softener. Accordingly, the cold/hot water softener according to the present invention can control the four operation modes necessary for use of the cold/hot water softener through the one switching valve 40.

Furthermore, by a control part 130 for controlling the valve drive part 50 based on the results of sensing of the temperature sensor 72 and flow meter 74, the cold/hot water softener has an automatic regeneration function of converting automatically from the intermittence mode to the regeneration mode depending on total flux of raw water. It also has a function of preventing a sudden change of temperature of the cold/hot soft water discharged from the water outlet 112 upon the water softening mode, and other convenient functions.

Figure 3:
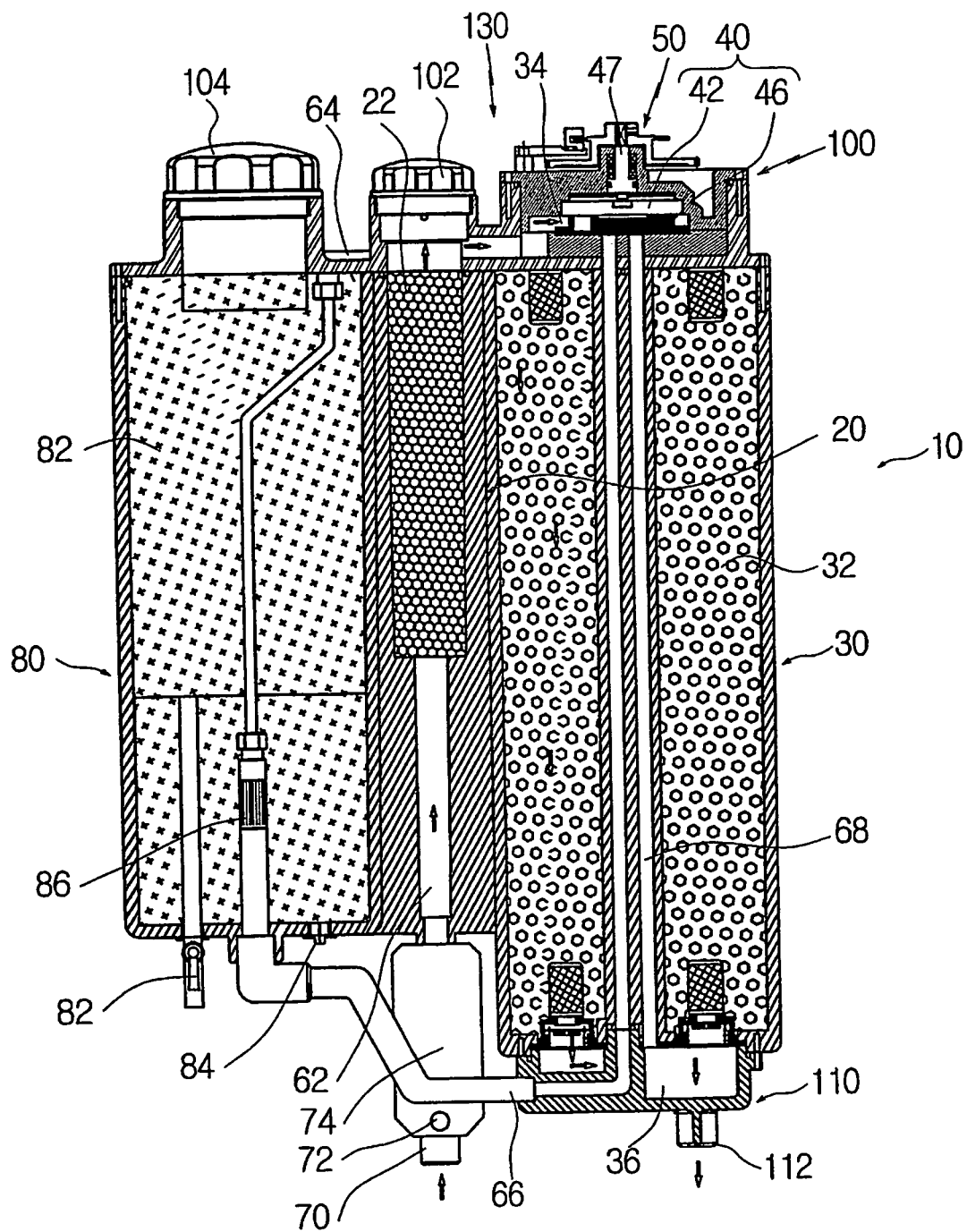
FIG. 3 is a cross-sectional view of a cold/hot water softener according to the invention.

FIG. 3 is a cross-sectional view for explaining the inner structure of the cold/hot water softener according to the present invention. The cold/hot water softener includes a body 10 having the water softening tank 30 and the regenerating tank 80 each positioned right and left therein and a pre-processing filter 20 positioned between the water softening tank 30 and the regenerating tank 80, upper and lower frames 100, 110 engaged to upper and lower parts of the body, respectively, a plurality of pipes 62, 64, 66, a switching valve 40 installed in an upper end of the water softening tank 30, a valve drive part 50 for directly controlling operations of the switching valve 40, and a control part 130 for controlling the cold/hot water softener.

Figure 4:
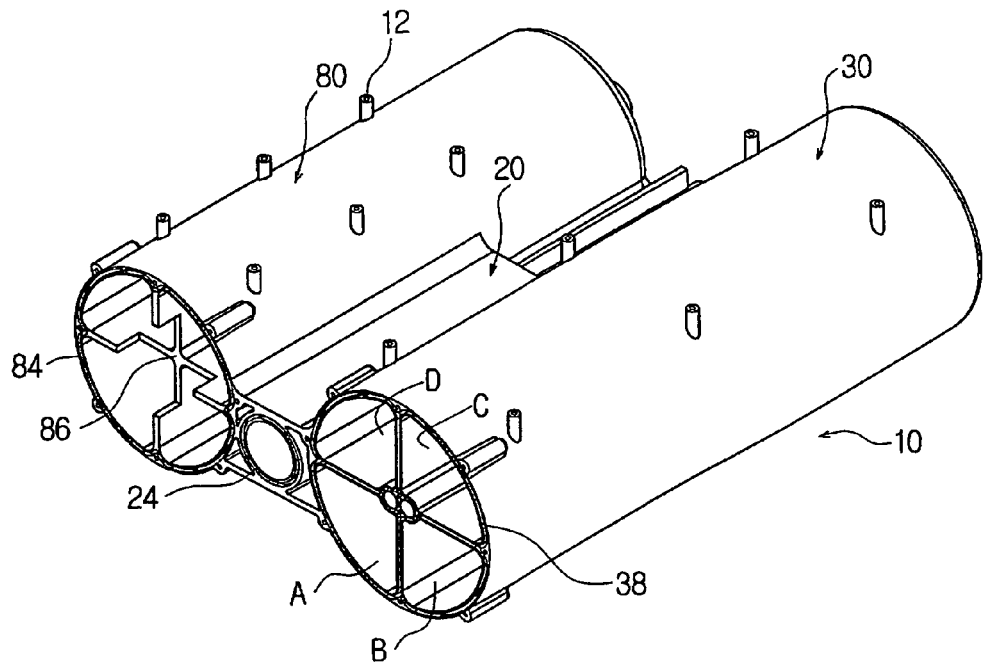
FIG. 4 is a perspective view of a body of a cold/hot water softener according to the invention.

Referring FIG. 4 in which only the body 10 of the cold/hot water softener according to the present invention has been shown, at least two or more water softening regions having a cylindrical inner portion which are filled with the ion exchange resin are divided in the water softening tank 30 installed in the body 10. More preferably, the water softening tank is divided and defined by four water softening regions A, B, C, D along the longitudinal direction of length of the water softening tank and arranged radially therein as shown in drawings.

The pre-processing filter 20 and the regenerating tank 80 are formed in a cylindrical shape and positioned in the body 10 with bottom surfaces thereof being closed. A designated filter 22 is positioned in the inside of the pre-processing filter 20, and regenerating substance 82 by the ion exchange resin 32 such as salt, etc., is stored in the inside of the regenerating tank 80.

A valve region 34 is defined in the upper end of the water softening tank 30. Each of the water softening regions A, B, C, D is joined and the switching valve 40 is installed in the valve region 34. A water outlet region 36 is defined in the lower end of the water softening tank 30. Each of the water softening regions A, B, C, D is joined in the water outlet region 36 communicated with the outside. On this account, the upper frame 100 coupled to the upper end of the body 10 is formed with an inner space for securing the valve region 34 in the upper end of the water softening tank 30, and provided with a filter stopper 102 and a regenerating tank stopper 104 for opening the insides of the pre-processing filter 20 and the regenerating tank 80, respectively.

The lower frame 110 coupled to the lower end of the body 10 is formed with an inner space for securing the water outlet region 36 in the lower end of the water softening tank 30, and provided with a water outlet 112 for communicating the water outlet region 36 to the outside.

In this case, preferably, the upper ends of the pre-processing filter 20, the water softening tank 30, and the regenerating tank 80 along with the lower end of the water softening tank 30, although it is not clearly shown in the drawings, can be provided O-rings 24, 38, 84 made from rubber, respectively, such that the upper and lower frames 100 110 can be closely engaged each other. A plurality of fixtures 12 can be projected out of the outer surface of the body 10 such that a case for an appearance as not shown in the drawing can be engaged. A reinforcement rib 86 having a designated shape can be installed within the regenerating tank 80 for preventing change of the form due to physical pressure of the outside.

In addition, the cold/hot water softener according to the present invention includes a raw water supply pipe 62 for supplying raw water from the outside to the valve region 34 in the upper end of the water softening tank 30, a regenerating raw water pipe 64 connecting the valve region 34 to the upper end of the regenerating tank 80, a regenerating water pipe 66 connecting the lower end of the regenerating tank 80 to the valve region 34, and a direct water pipe 68 connecting the valve region 34 to the water outlet region 36.

Preferably, the raw water supply pipe 62 bypasses the pre-processing filter 20; the regenerating water pipe 66 begins from the lower end of the regenerating tank 80, inserted through the lower frame 110, and connected to the valve region 34 therein along with the longitudinal direction of the water softening tank 30; and a direct water pipe 68 is positioned therein along the inner longitudinal direction of the water softening tank 30 and connects the valve region 34 to the water outlet region 36. The temperature sensor 72 and the flow meter 74 are installed in the water inlet 70 which is the beginning part of the raw water supply pipe 62, respectively, and accumulate and meter the temperature and flux of the cold/hot raw water.

Figure 5:
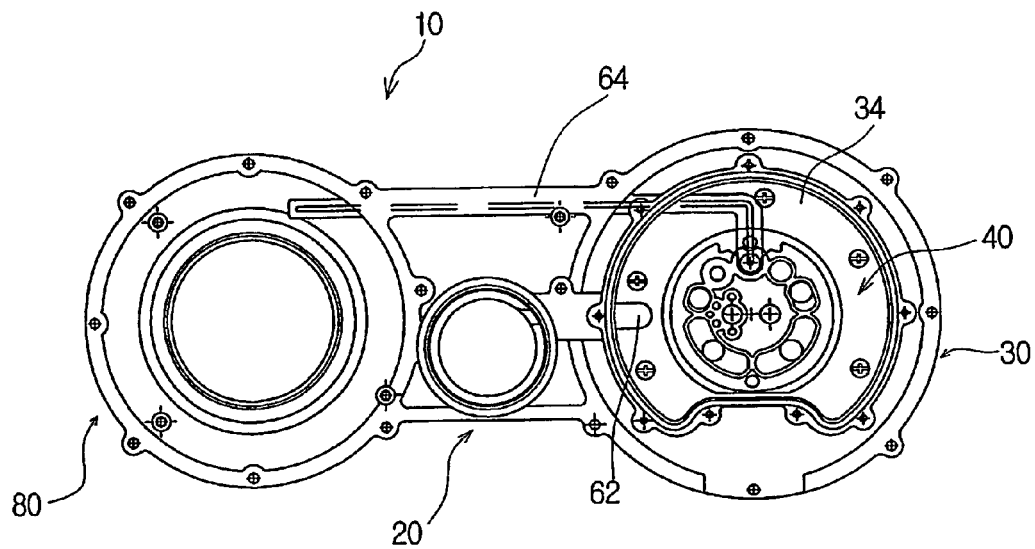
FIG. 5 is an elevation view of a body of a cold/hot water softener according to the invention.

Referring to FIG. 5 which is a top view showing the upper surface of the body 10 of the cold/hot water softener according to the present invention, the regenerating raw water pipe 64 connects the valve region 34 to the upper end of the regenerating tank 80 along the upper surface of the body 10, and the raw water supply pipe 62 is inserted from a side of the valve region 34 for supplying raw water.

Then, the switching valve 40 is installed within the valve region 34 of the upper end of the water softening tank 30. The switching valve 40 includes a static disk 42 for closing the upper ends of each of the water softening regions A, B, C, D, and a rotary disk 46 which is positioned on the surface thereof and can be rotated around a center axis 47.

Specifically explaining each of them, firstly the static disk 42 includes soft water holes 42a, 42b, 42c, 42d and regenerating water distribution holes 42e, 42f, 42g, 42h communicated with each of the water softening regions A, B, C, D of the water softening tank 30, a direct water hole 42i communicated with the direct water pipe 68, a regenerating raw water hole 42j communicated with the regenerating raw water pipe 64, a regenerating water hole 42k communicated with the regenerating water pipe 66, and a closed hole 42l, and is exposed to the upper surface thereof.

The soft water holes 42a, 42b, 42c, 42d and the regenerating water distribution holes 42e, 42f, 42g, 42h are each provided in the same number of the water softening regions A, B, C, D of the water softening tank 30 to correspond each other one to one. In the preceding descriptions, since the water softening regions A, B, C, D are described based on the four regions, the soft water holes 42a, 42b, 42c, 42d and the regenerating water distribution holes 42e, 42f, 42g, 42h will also be explained by an example of a case having four holes each.

Referring to FIGS. 3 and 5, it can be easily expected that the regenerating water pipe 66 and the direct water pipe 68 are inserted into the back surface of the static disk 42 and communicated with the regenerating water hole 42k and the direct water hole 42i, respectively, and that the regenerating raw water pipe 64 is inserted into the side of the static disk 42 and communicated with the regenerating raw water hole 42j. In such a case, particularly the regenerating water hole 42k is positioned eccentrically from the center of the static disk 42 to one side, the regenerating water distribution holes 42e, 42f, 42g, 42h are arranged along edges of the regenerating water hole 42k, and each of the soft water holes 42a, 42b, 42c, 42d, the direct water hole 42i, the regenerating raw water hole 42j and the closed hole 42l are arranged radically in turn along the edges of the outside fixing disk 42 and maintained in equal distances from the center of the fixing disk 42.

In particular, it is desired that each of the inner pressures of the soft water holes 42a, 42b, 42c, 42d and the regenerating water distribution holes 42e, 42f, 42g, 42h is equal each other. On behalf of this, the regenerating water distribution holes 42e, 42f, 42g, 42h are arranged such that they have the same diameter each other and for maintaining in the same distance from the regenerating water hole 42k and the distance of connecting with each of the water softening regions A, B, C, D is also equal each other. It can be attained by properly adjusting the positions of the regenerating water hole 42k and the regenerating water distribution holes 42e, 42f, 42g, 42h.

The soft water holes 42a, 42b, 42c, 42d are provided with enlarged grooves 44a, 44b, 44c, 44d in which the upper areas are expanded. The each of the enlarged grooves 44a, 44b, 44c, 44d surrounds the corresponding soft water holes 42a, 42b, 42c, 42d, and is closely positioned each other not to interfere with the neighboring holes. The enlarged grooves 44a, 44b, 44c, 44d allow the soft water holes 42a, 42b, 42c, 42d exposed sequentially by the rotation of the rotary disk 46 to be maintained in the same inner pressure and, at the same time, can prevent a phenomenon of water hammer which may cause an eddy, a vibration and an impact when fluid of the high pressure is suddenly directed to the narrow flow paths. The soft water holes 42a, 42b, 42c, 42d, the regenerating water distribution holes 42e, 42f, 42g, 42h and the enlarged grooves 44a, 44b, 44c, 44d will be described again in the corresponding parts therein.

Figure 6:
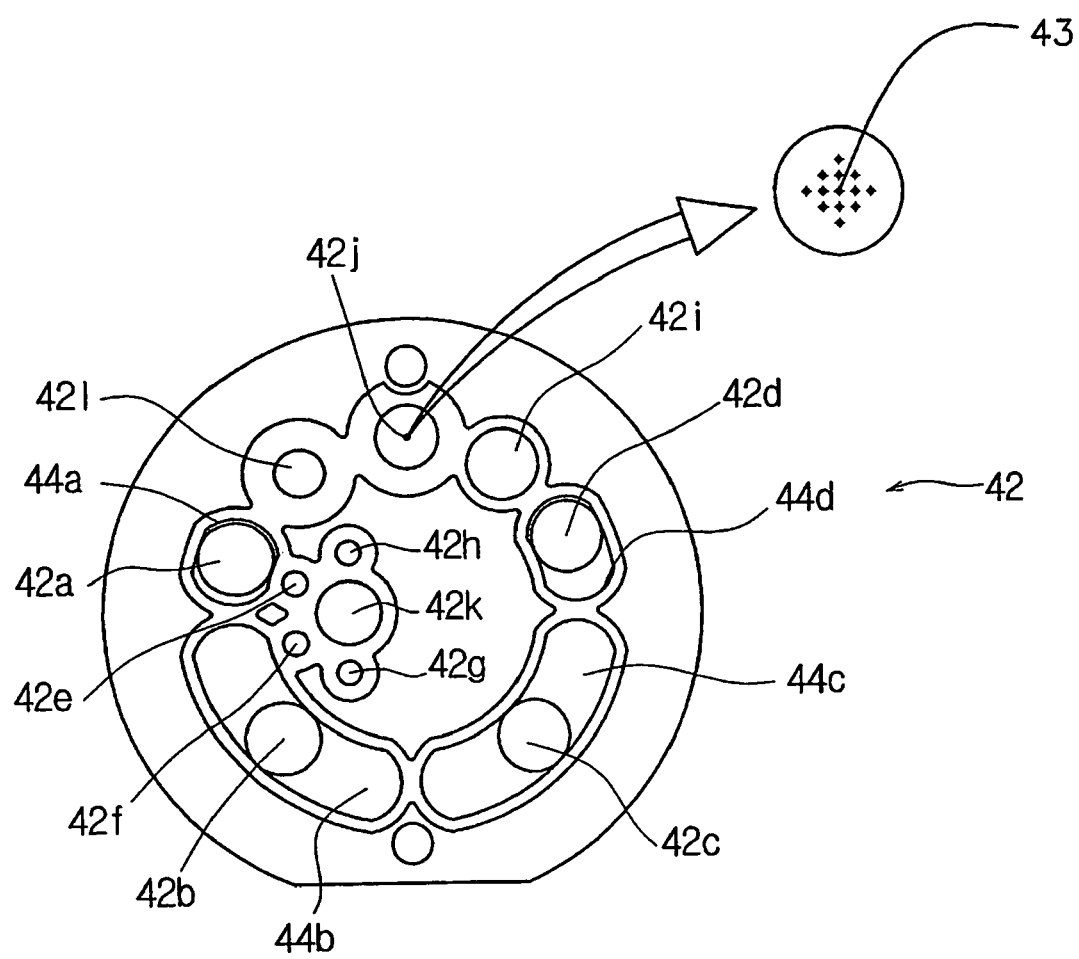
FIG. 6 is an elevation view and an isolated elevation view showing a static disk of a switching valve of a cold/hot water softener according to the invention, respectively.
Figure 7:
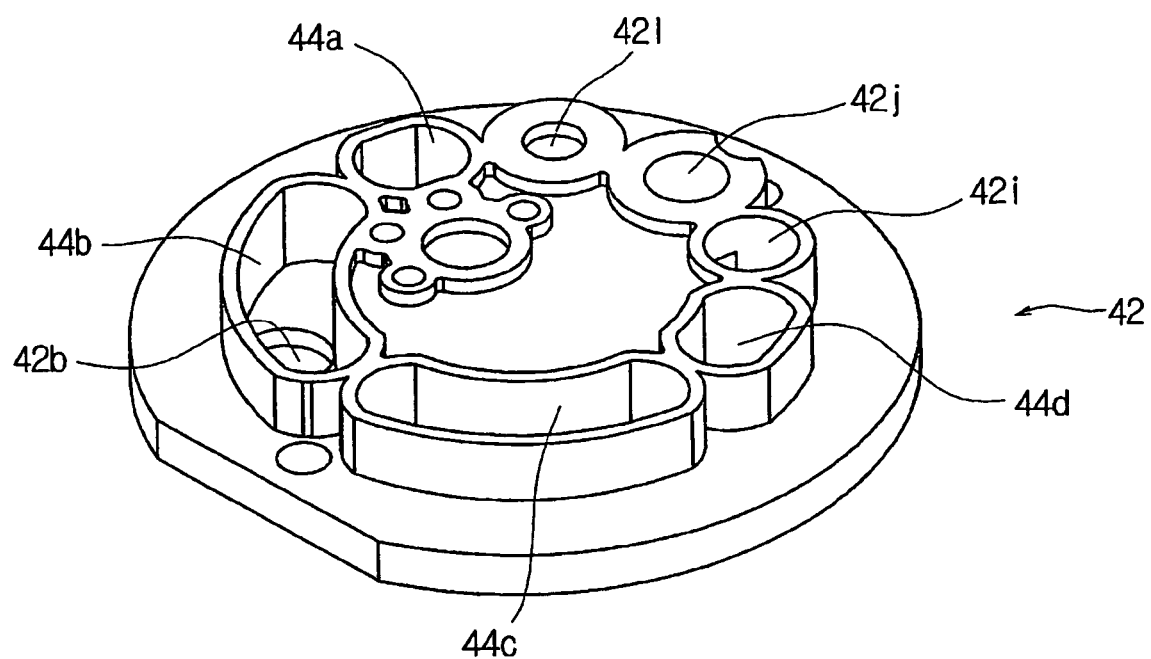
FIG. 7 is a perspective view, showing a static disk of a switching valve of a cold/hot water softener according to the invention.

The regenerating raw water hole 42j has a relatively small diameter than the other holes. It is desired that the regenerating raw water hole is comprised of a plurality of fine holes 43 as shown in a circle of FIG. 6. Because the regenerating water required for regenerating the ion exchange resin 32 is typically adequate in a small quantity, the diameter of the regenerating raw water hole is relatively small in order to prevent a case that unnecessarily much amount of raw water is supplied to the regenerating tank 80 and the regeneration material is wasted. In order to prevent a contamination of the ion exchange resin 32, the regenerating raw water hole is formed with a plurality of the fine holes 43 for filtering secondly impurities from raw water flowed from the regenerating tank 80.

That is, although relative big impurities from raw water first supplied from the outside can be first filtered by providing the pre-processing filter 20 in the cold/hot water softener according to the present invention, the fine holes thereof are provided in order to prevent a contamination of the ion exchange resin 32 that may be caused when the impurities unfiltered yet are supplied to the water softening regions A, B, C, D along with the regenerating water.

Figure 8:
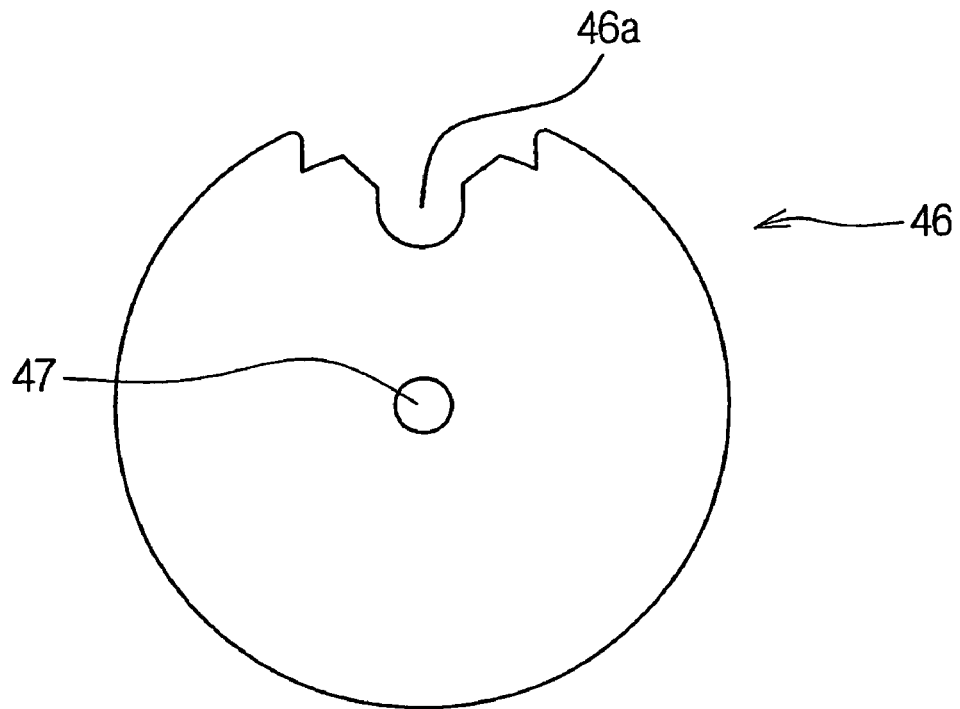
FIG. 8 is an elevation view showing a rotary disk of a switching valve of a cold/hot water softener according to the invention.
Figure 9:
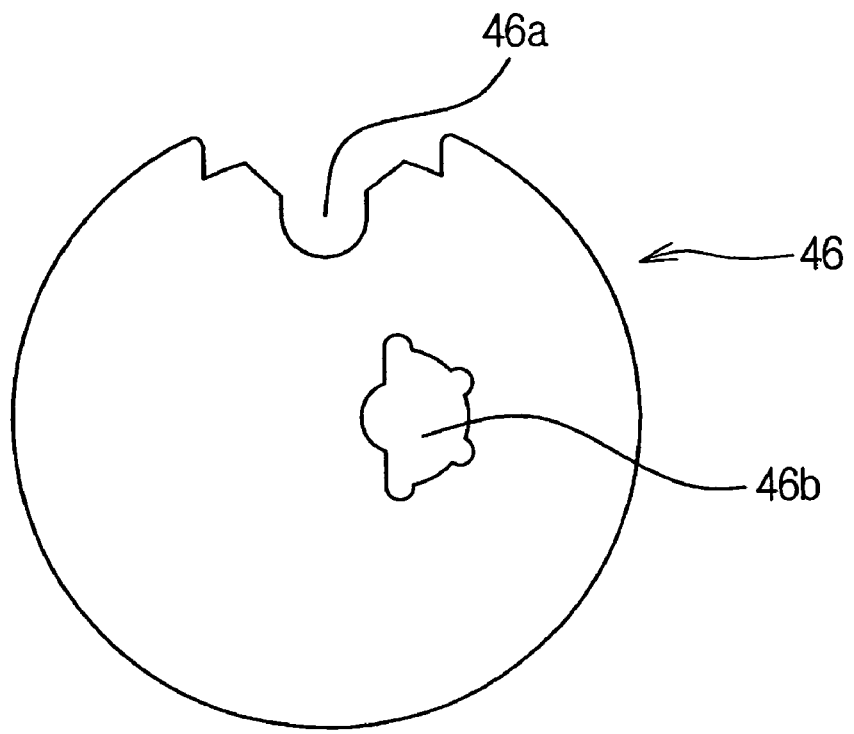
FIG. 9 is an elevation view showing the joined statue of a static disk and a rotary disk of a switching valve of a cold/hot water softener according to the invention.

In addition, the rotary disk 46 is positioned rotationally around a center of the static disk thereon, which is specifically shown in FIGS. 8 and 9. A connecting opening 46a is perforated up and down through an edge of a side of the rotary disk 46. A trap groove 46b is formed with a predetermined shape on the back surface of the rotary disk. The trap groove is recessed at an eccentric position to a side from the center thereof and interconnects the regenerating water hole 42k of the static disk 42 to the regenerating water distribution holes 42e, 42f, 42g, 42h.

The center axis 47 is perforated through the upper frame 100 and projected upwardly above the center thereof to be exposed outside. As the rotary disk 46 rotates around the center axis 47 thereof, a predetermined one of the soft water holes 42a, 42b, 42c, 42d is exposed to the valve region 34 by the connecting opening 46a in the water softening mode, the regenerating water hole 42k and the regenerating water distribution holes 42e, 42f, 42g, 42h are interconnected by the trap groove 46b consequently with the exposure of the regenerating raw water hole 42j to the valve region 34 in the regeneration mode, the direct water hole 42i is exposed to the valve region 34 in the direct water mode, and the closed hole 42l is exposed to the valve region 34 in the intermittence mode.

Referring to the previous descriptions, it can be understood that the raw water supplied from the raw water supply pipe 62 is flowed in the valve region 34. Consequently, raw water is supplied to the exposed soft water holes 42a, 42b, 42c, 42d and the soft water is discharged to the water outlet 112 in the water softening mode, and the raw water is supplied to the exposed regenerating raw water hole 42j, flowed along the regenerating raw water pipe 64 into the regenerating tank 80 and then the regenerating water returned through the regenerating water pipe 66 is flowed through the regenerating water hole 42k into the trap groove 46b and distributed into the each of the regenerating water distribution holes 42e, 42f, 42g, 42h in the regeneration mode.

Accordingly, it was already mentioned that, in regenerating the ion exchange resin 32 by supplying the regenerating water to the ion exchange resin 32 of each of the water softening regions A, B, C, D, each of the regenerating water distribution holes 42e, 42f, 42g, 42h should have a equal inner pressure so as to regenerating equally the ion exchange resin 32 contained in each of the water softening regions A, B, C, D.

Furthermore, because raw water is flowed into the exposed direct water hole 42i and the direct water as the raw water itself is discharged through the direct water pipe 68 and the water outlet 112 in the direct water mode, and there is no space for allowing the raw water in the valve region 34 to be escaped, by means of the closed hole 42*l* in the intermittence mode, inflow of the raw water into the raw water supply pipe 62 can be stopped.

Figure 11:
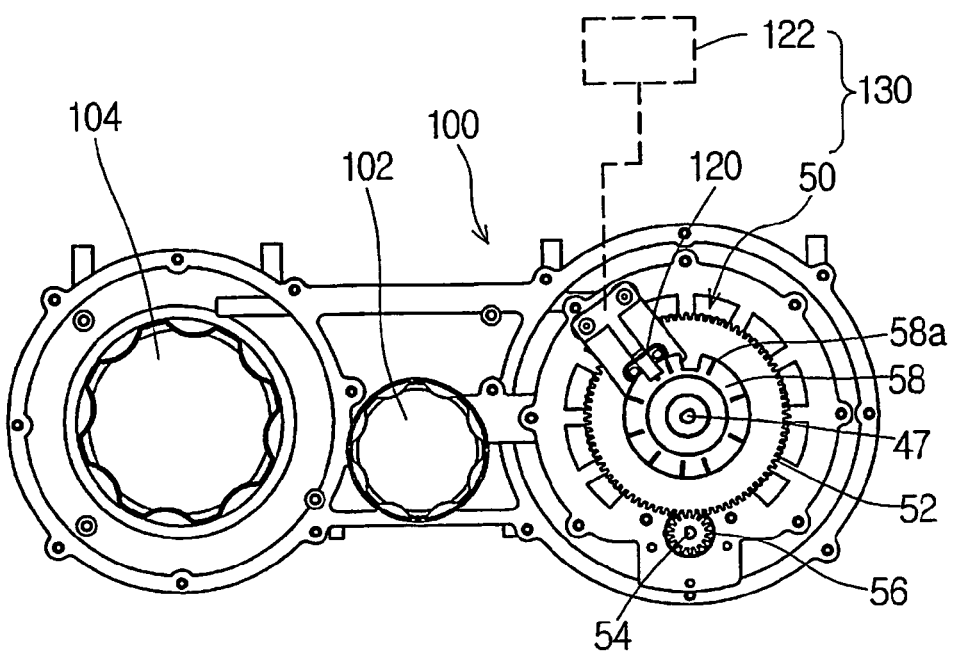
FIG. 11 is an elevation view showing the operational status of a switching valve according to the change of temperature upon a water softening mode of a cold/hot water softener according to the invention.

FIG. 11 shows a plain construction for the upper frame 100 and the valve drive part 50 positioned to the outside of the upper frame of the cold/hot water softener according to the present invention. The valve drive part 50 includes a main gear 52 having a center which is penetrated and fixed to the center axis 47 of the rotary disk 46 which penetrates the upper frame 100 and is exposed to the outside, power mean such as a motor, etc., having a rotation shaft 54 although the power means is not clearly shown in the drawings, and a motor gear 56 for engaging the main gear 52 under the condition that a center of the motor gear is penetrated with the rotation shaft 54 and fixed to the rotation shaft and for rotating the rotary disk 46.

Consequently, in order to control freely the rotation of the rotary disk 46 by controlling the direction and angle of the rotation shaft 54 and the motor gear 56, particularly the center axis 47 of the rotary disk 46 penetrates a center of a rotation plate 58 and is fixed to the rotation plate, and grooves or other type of discrimination marks are marked in the center of the rotation plate along the edges of the rotary disk 46. As a result, the rotation plate 58 can be rotated along with the rotary disk 46.

The above-mentioned control part 130 for controlling the valve drive part 50 includes a position detecting sensor 120 which is fixed to an edge of a side of the rotation plate 58 such that a discrimination mark 58*a* of the rotation plate 58 can be detected, and a logical operation device 122 such as a microprocessor etc., for controlling the direction and angle of rotation of the rotation shaft 54 as a power mean with a uniform algorithm based on the results of detect of the temperature sensor 72, flow meter 74 and the position detecting sensor 120.

According to the algorithm of the logical operation device 122, basically on the water softening mode, raw water flowed in the water inlet 70 is supplied to each of the divided water softening regions A, B, C, D depending on the temperature, and a change from the intermittence mode to the regeneration mode can be made depending on the total flux of raw water. This will be more specifically described on the corresponding description.

Referring again to FIG. 3, regenerating tank 80 has several elements for generating and supplying a uniform concentration of regenerating water, and also includes a water level detecting sensor 84 for detecting the water level of the regenerating water contained in the regenerating tank 80, a supply valve 86 for controlling the regenerating water with the regular water level by opening and closing the bottom surface of the regenerating tank 80, and an agitation means such as a screw, etc., for agitating the raw water and regenerated liquid in the regenerating tank 80.

The cold/hot water softener according to the invention is operated by the following four modes. Each of the modes will be described in detail herein below.

A. Water Softening Mode

Figure 10:
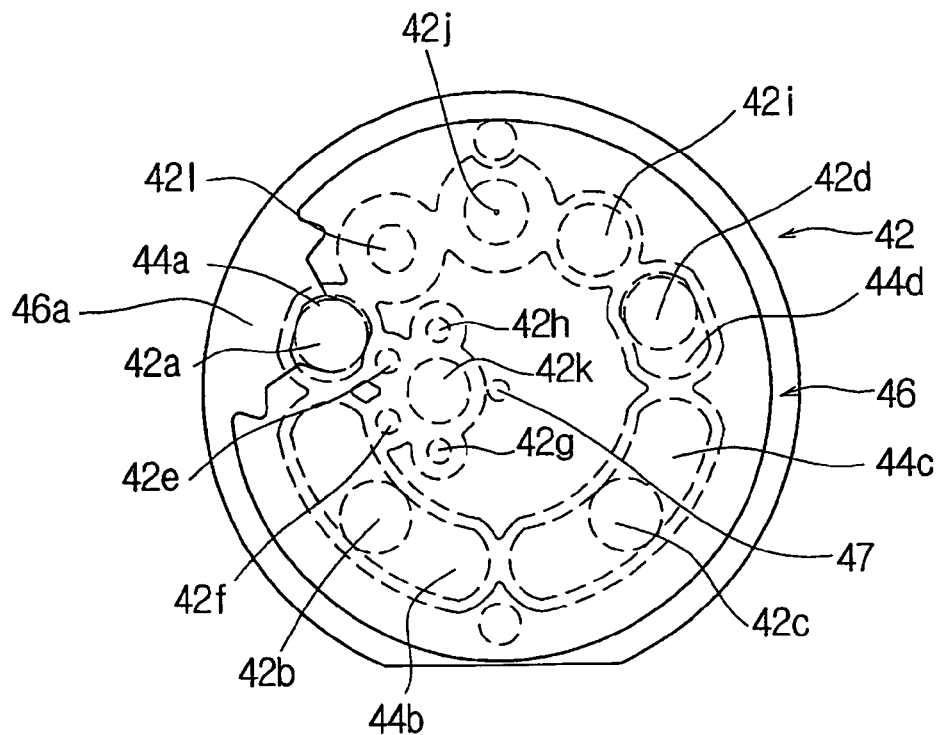
FIG. 10 is an elevation view of a valve driving part installed on a upper frame of a cold/hot water softener according to the invention.

This mode will be described with reference to FIG. 3 showing the sectional view of the referred cold/hot water softener and FIG. 10 showing view of the status combining the static disk 42 and the rotary disk 46. In the cold/hot water softener of the invention, upon a water softening mode, the temperature sensor 72 and the flow meter 74 provided in the water inlet 70 are operated respectively. The cold/hot raw water is supplied through the water inlet 70 to the raw water supplying pipe 62.

The supplied cold/hot raw water is flown through the pre-processing filter 20 to the valve region on the top end of the water softening tank. At this time, the connecting hole 46*b* of the rotary disk 46 of the switching valve 40 exposes one of the water softening holes 42*a*, 42*b*, 42*c* and 42*d* communicated to one selected from the water softening regions A, B, C, D by the valve driving part 50. Thus, the raw water is flown through the relevant water softening hole 42*a*, 42*b*, 42*c* or 42*d* into the water softening region A, B, C or D communicated thereto, thereby to be changed into the soft water. Then, the soft water is discharged through the water discharging region to the water outlet 112.

At this time, the logical operating device 122 opens one of the water softening regions A, B, C and D based on the result sensed by the temperature sensor 72. According to the algorithm for judging this operation, firstly, when much cold soft water is required in summer, the cold raw water below a predetermined temperature is supplied to the at least three water softening regions among the four water softening regions A, B, C and D, the hot raw water having higher temperature than the predetermined temperature is supplied to the rest water softening region thereof. Thus, even if the required amount of the cold soft water is increased, enough cold soft water can be discharged.

Secondly, when much hot soft water is required in winter, contrary to the above case, the hot raw water above a predetermined temperature is supplied to the at least three water softening regions among the four water softening regions A, B, C and D, the cold raw water having lower temperature than the predetermined temperature is supplied to the rest water softening region thereof. Thus, even if the required amount of the hot soft water is increased, enough hot soft water can be discharged.

Thirdly, when the required amount of the cold soft water is similar to that of the hot soft water, the hot raw water is supplied to two water softening regions among the four water softening regions A, B, C and D, and the cold raw water is supplied to the rest two water softening regions. Here, the water softening regions to which the hot raw water or the cold raw water is supplied may be arranged crisscross. For example, if the hot raw water is supplied to the water softening region A, the water softening region B is supplied with the cold raw water, the water softening region C is supplied with the hot raw water, and the water softening region D is supplied with the cold raw water.

Figure 12:
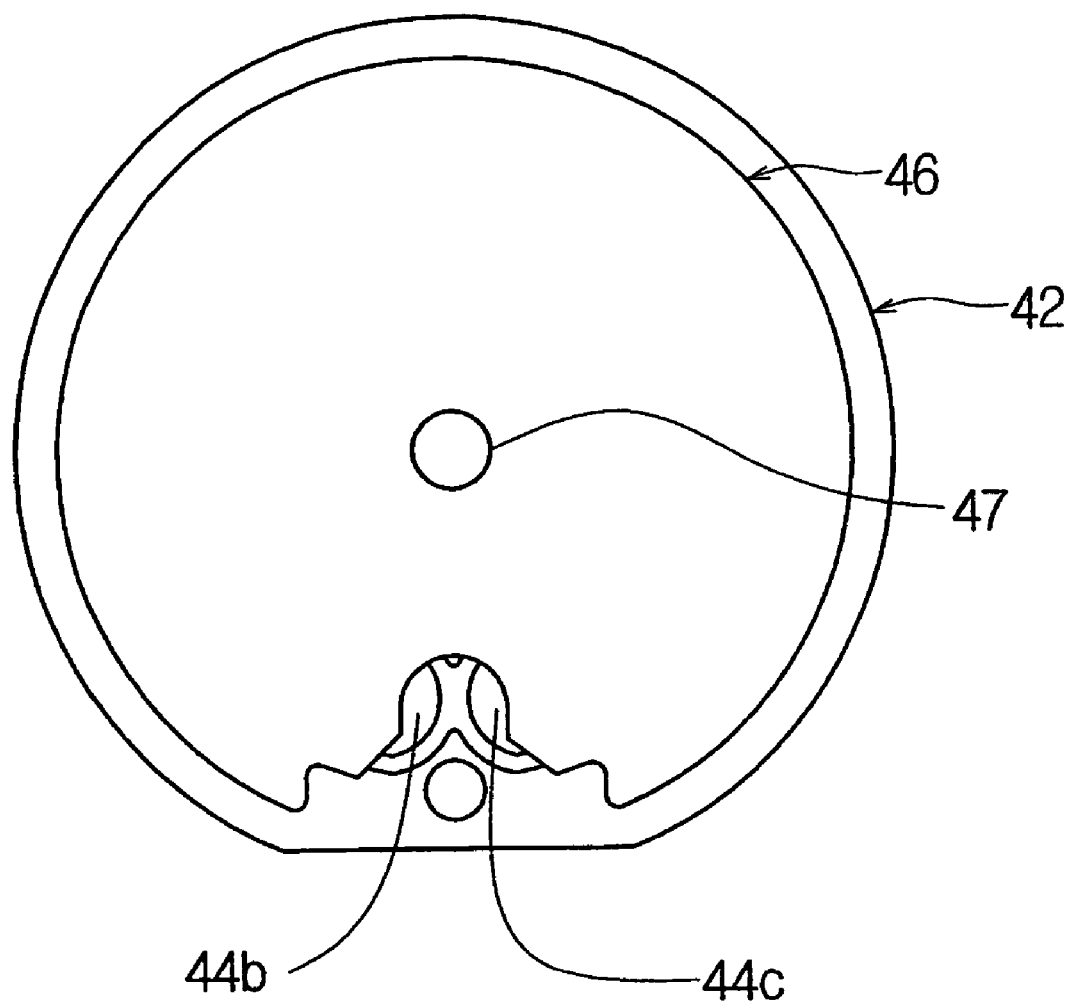
FIG. 12 is a cross-sectional view of a cold/hot water softener, showing the operational status of a switching valve, respectively, upon a regeneration mode of a cold/hot water softener according to the invention.

This prevents the sudden change of the temperature of the soft water discharged to the water outlet 112. Upon the wafer softening mode of the cold/hot water softener of the invention, referring to FIG. 12 showing a plan view for illustrating operational status of the switching valve according to temperature, top end of the respective one of the water softening holes 42*a*, 42*b*, 42*c* and 42*d* exposed on an upper surface of the static disk 42 has an enlarged area to be adjacent each other by the respective one of the enlarged grooves 44*a*, 44*b*, 44*c* and 44*d*. When the water softening regions A, B, C and D in which the raw water flows are changed upon the rotation of the rotary disk 46, the connecting opening 46*b* simultaneously exposes adjacent two enlarged grooves (44*b* and 44*c* in FIG. 12).

In such a case, since two water softening regions B and C are supplied with the raw water, the soft water having an intermediate temperature by mixing the cold raw water and the hot raw water is discharged. Thus, even if a user suddenly changes from the cold water softening mode to the hot water softening mode, the change of the temperature is gently performed. To do this, as described above, the respective one of the enlarged grooves 44*a*, 44*b*, 44*c* and 44*d* enlarging the respective one of the water softening holes 42a, 42b, 42c and 42d should be formed to be adjacent each other.

B. Regeneration Mode

The cold/hot water softener of the invention is operated in a regeneration mode in the following two cases. That is, the one case is that the switching valve 40 is switched by the selection of the user, and the other case is that a intermittence mode is automatically changed into the regeneration mode periodically by the controlling part 130 according to the result sensed by the flow meter 74 provided on the water inlet 70.

The former of the above cases may be easily understood since it is not different from general water softener. However, the latter is characteristic of the cold and hot water softener of the invention. Especially, the reason why the intermittence mode is changed into the regeneration mode is that the case that the user selects soft water or direct water is not disturbed. Thus, when the logical operation device 122 senses the inflow of the raw water having more than a predetermined amount through the flow meter 74, it additionally comprises an algorithm for changing automatically the initial intermittence mode to the regeneration mode.

Figure 13:
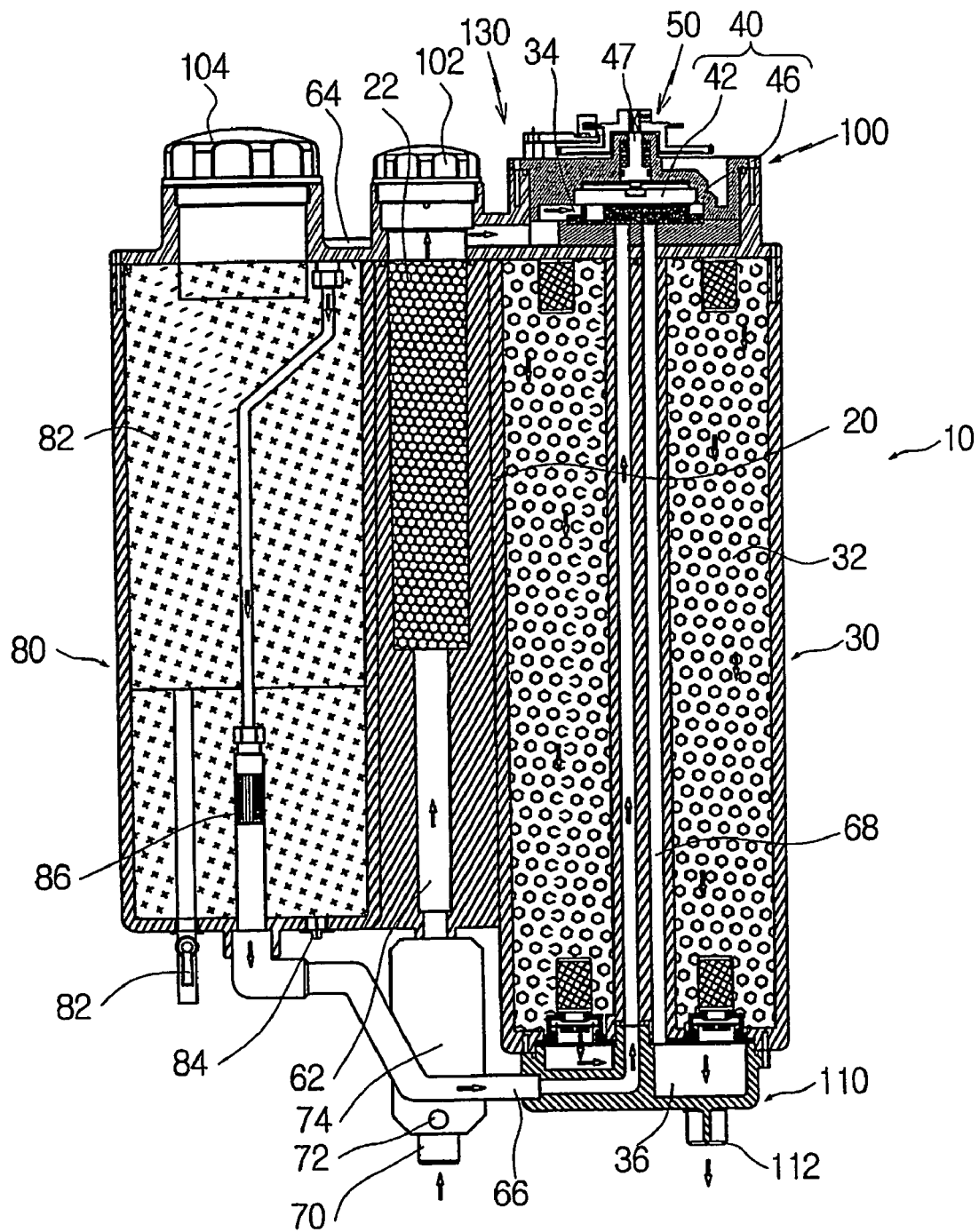
FIG. 13 is a cross-sectional view of a cold/hot water softener, showing the operational status of a switching valve, respectively, upon a direct water mode of a cold/hot water softener according to the invention and according to an applied embodiment of the invention.
Figure 14:
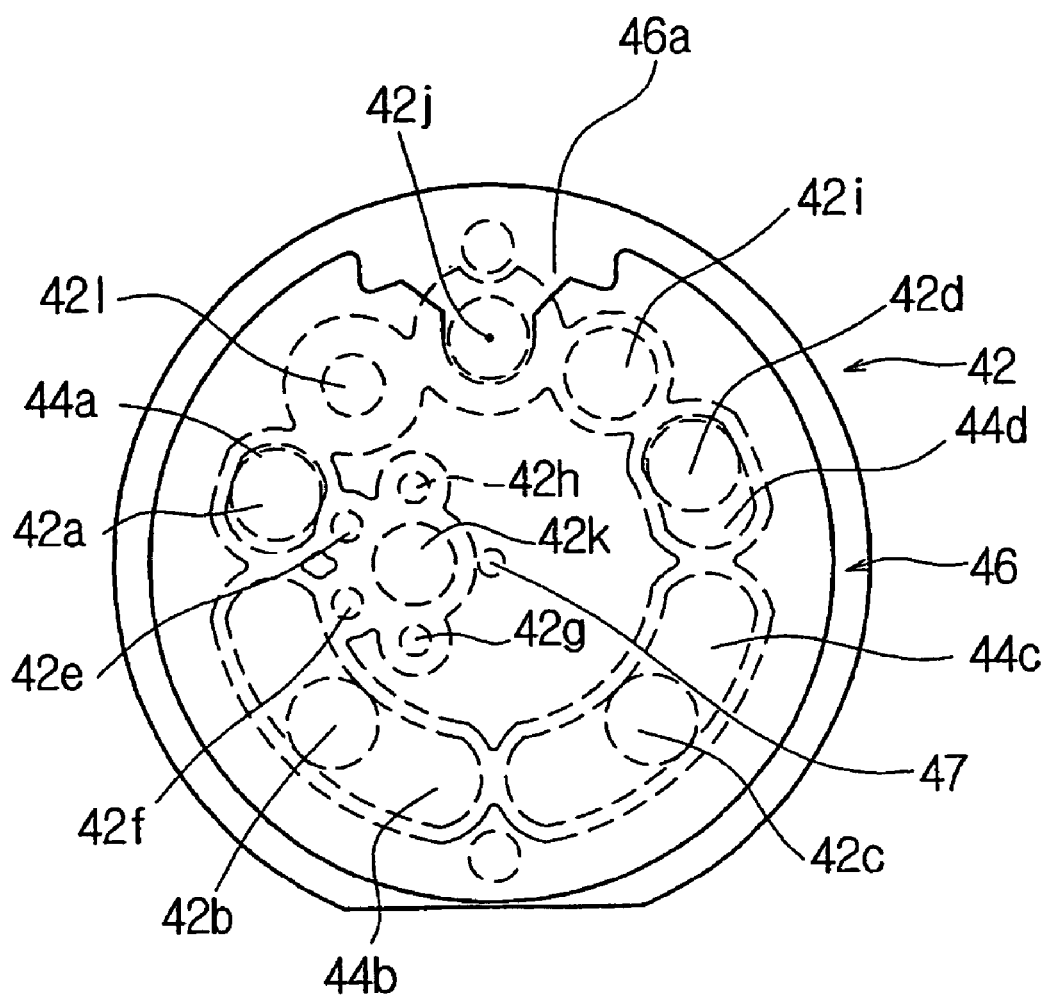
FIG. 14 is a front elevation view of a cold/hot water softener according to the invention.

Meanwhile, in the regeneration mode, the cold/hot water softener of the invention maintains the statuses in FIGS. 13 and 14, wherein, upon the regeneration mode, FIG. 13 shows a sectional view of the cold/hot water softener and FIG. 14 shows a plain view illustrating the operational status of the switching valve 40.

Referring to FIGS. 13 and 14, upon the regeneration mode, the rotary disk 46 is rotated by the control part 130 and the valve driving part 50, and then the regenerating raw water hole 42j is exposed within the valve region 34. Thus, the raw water which is flown in the valve region 34 through the water inlet 70, the soft water supply pipe 62, and the pre-processing filter 20 is induced into the regenerating raw water pipe 64 through the exposed regenerating raw water hole 42j.

Further, when the raw water passes through the regenerating tank 80, $Na^+$ ion is soluble therein. Then, the raw water is changed into the soft water and then the soft water is flow in the a trap groove 46b through the regenerating water pipe 66 and the regenerating water hole 42k. At this time, in the trap groove 46b, since the regenerating water hole 42k and the regenerating water distributing holes 42e, 42f, 42g and 42h are communicated each other, the regenerating water is flown in the respective one of the water softening regions A, B, C and D and then regenerates the relevant ion exchange resin 32, thereby to be discharged into the water outlet 112 through the water discharging region 36.

At this time, the amount of salt which is the regenerating substance filled within the regenerating tank 80 may be further used four and five times compared to the prior regenerating quantity. Thus, an inconvenience that salt should be inputted frequently may be removed. Further, upon a water direct discharging mode, it does not matter even if the flow meter 74 and the temperature sensor 72 are not driven.

C. Direct Water Mode

Figure 15:
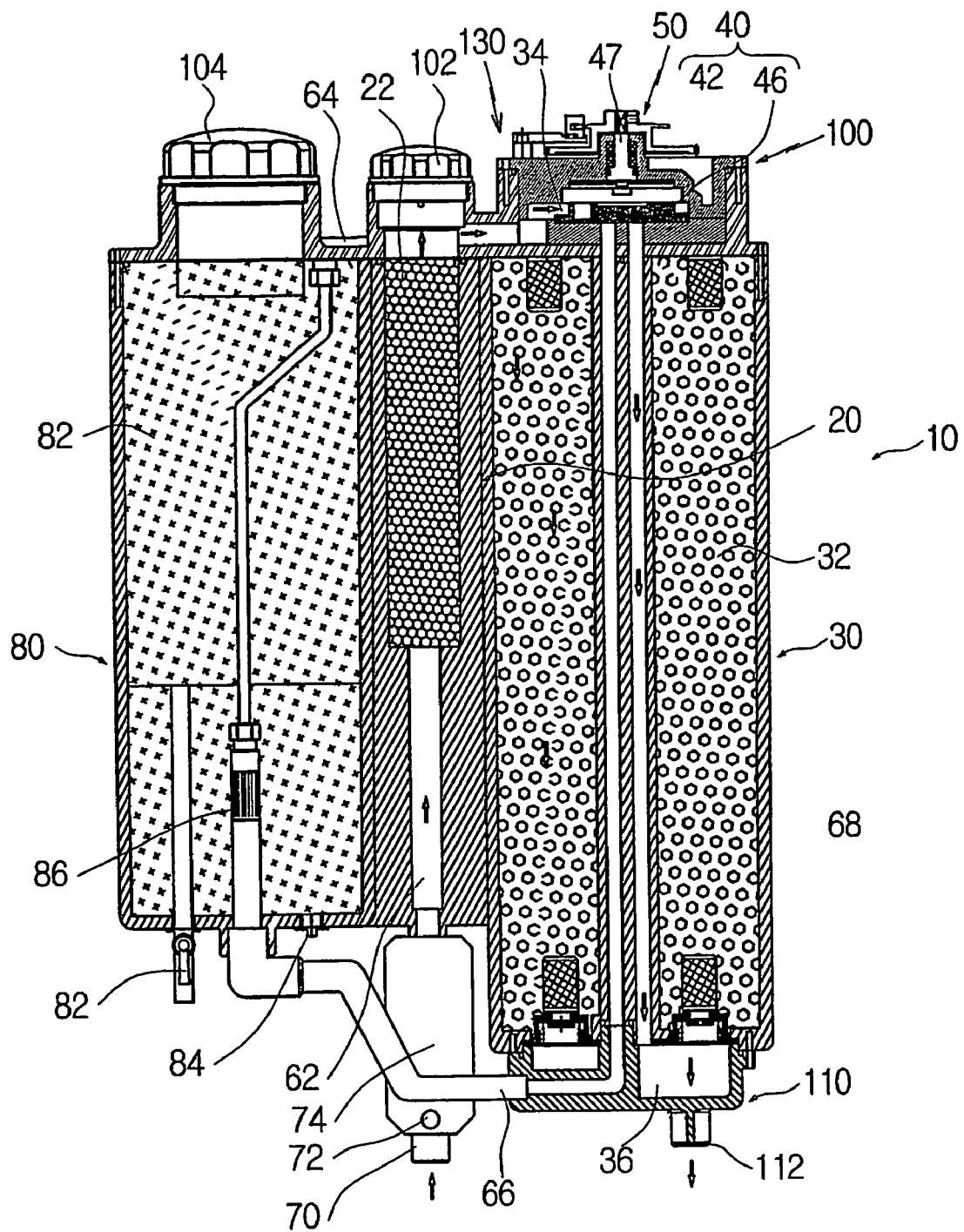
FIG. 15 is a cross-sectional view of a cold/hot water softener according to the invention.
Figure 16:
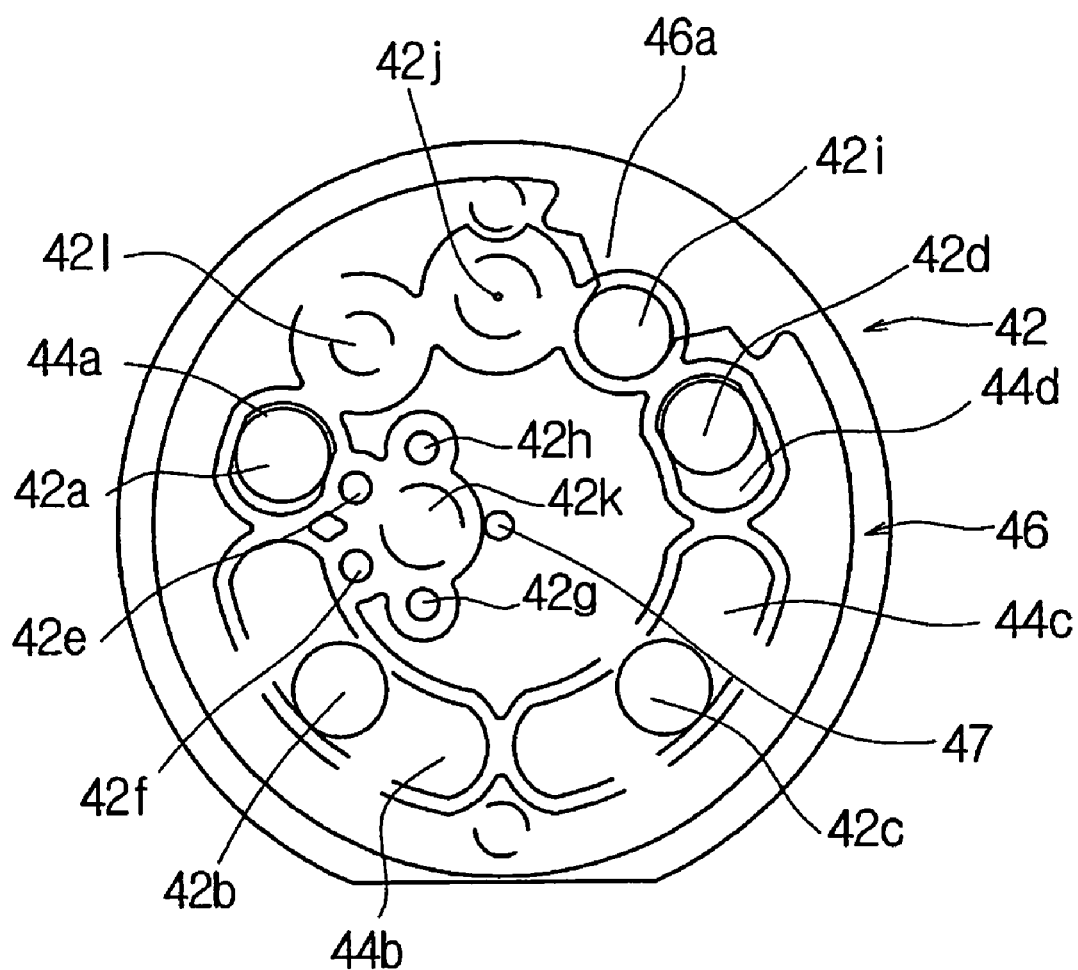
FIG. 16 is an elevation view of a tank part of a cold/hot water softener according to the invention.
Figure 17:
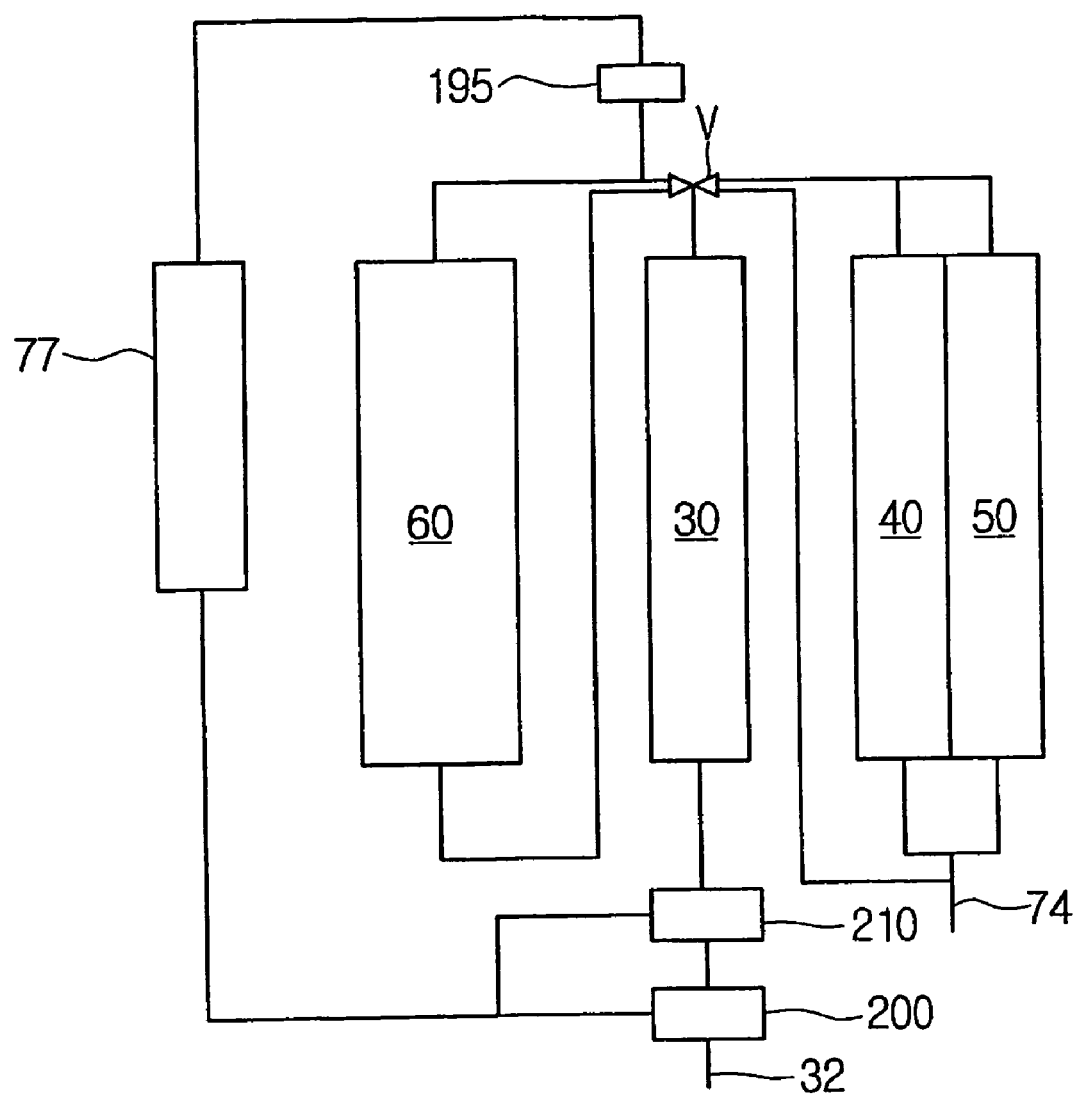
FIG. 17 is a block diagram of a cold/hot water softener according to another applied embodiment of the invention.
Figure 18:
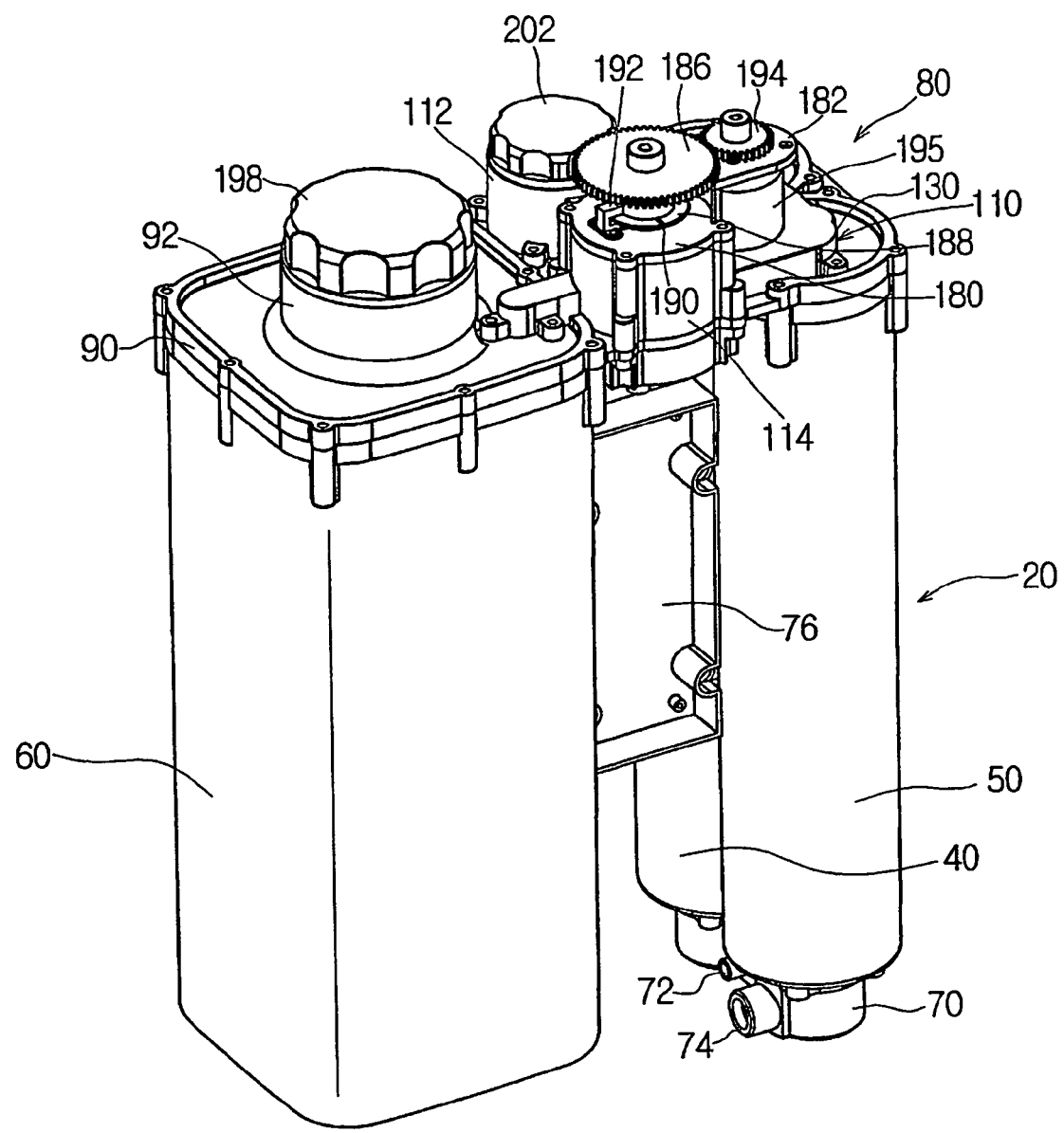
FIG. 18 is a front perspective view of a cold/hot water softener according to the invention.
Figure 19:
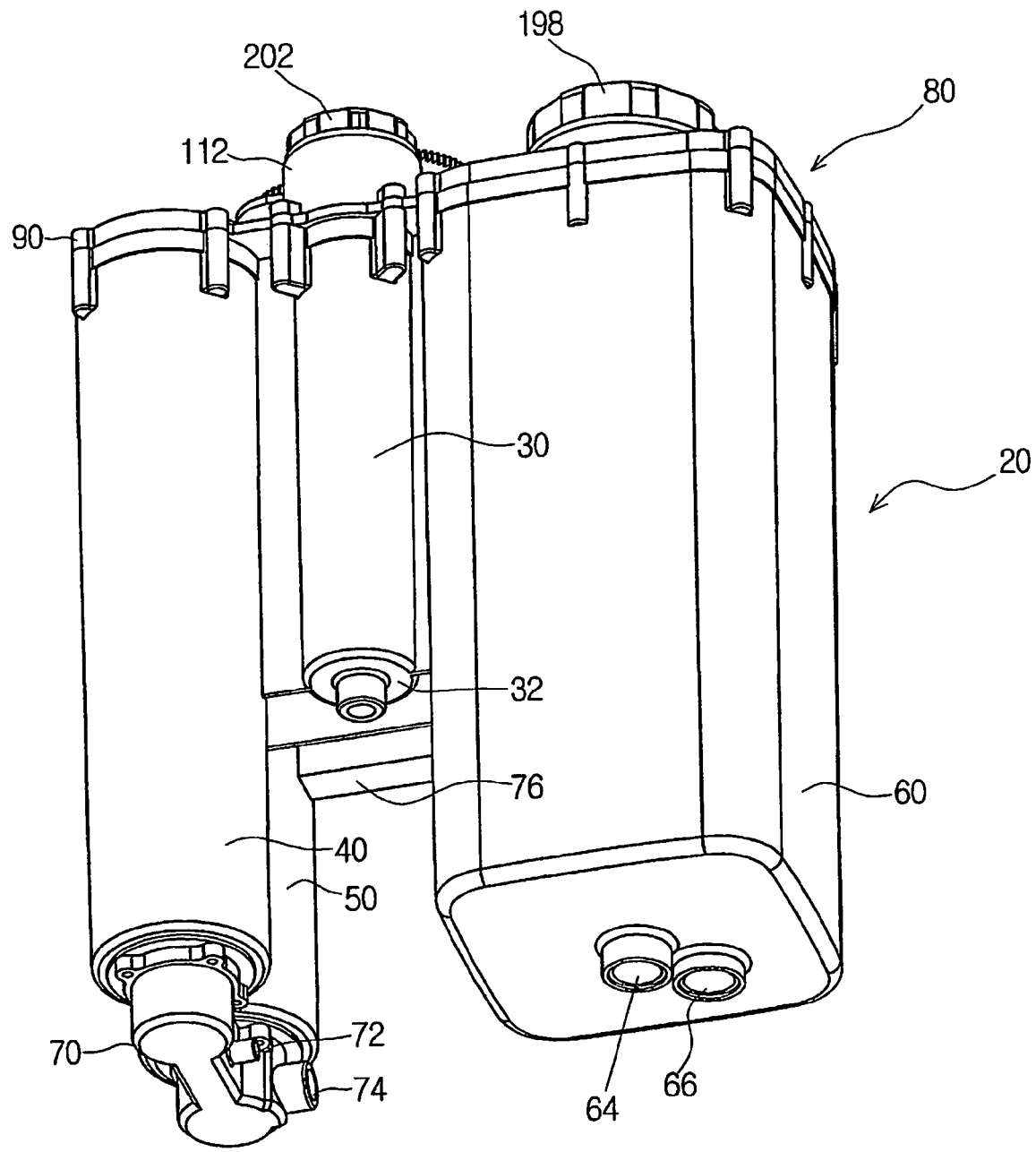
FIG. 19 is a rear perspective view of a bottom surface of a cold/hot water softener according to the invention.
Figure 20:
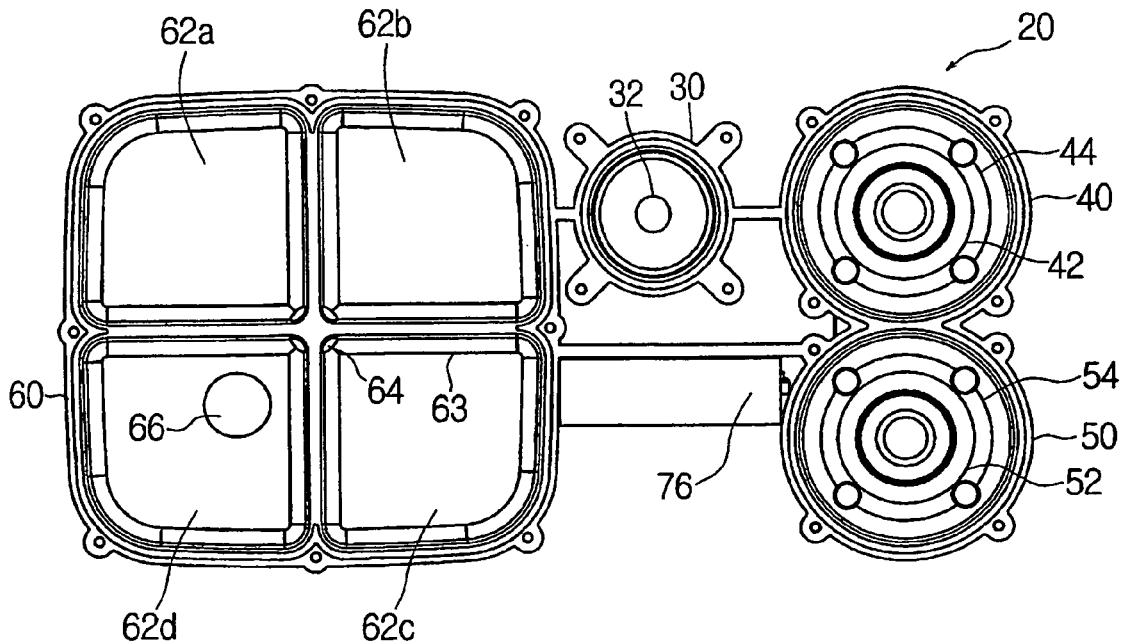
FIG. 20 is a bottom elevation view of a base plate of a cold/hot water softener according to the invention.
Figure 21:
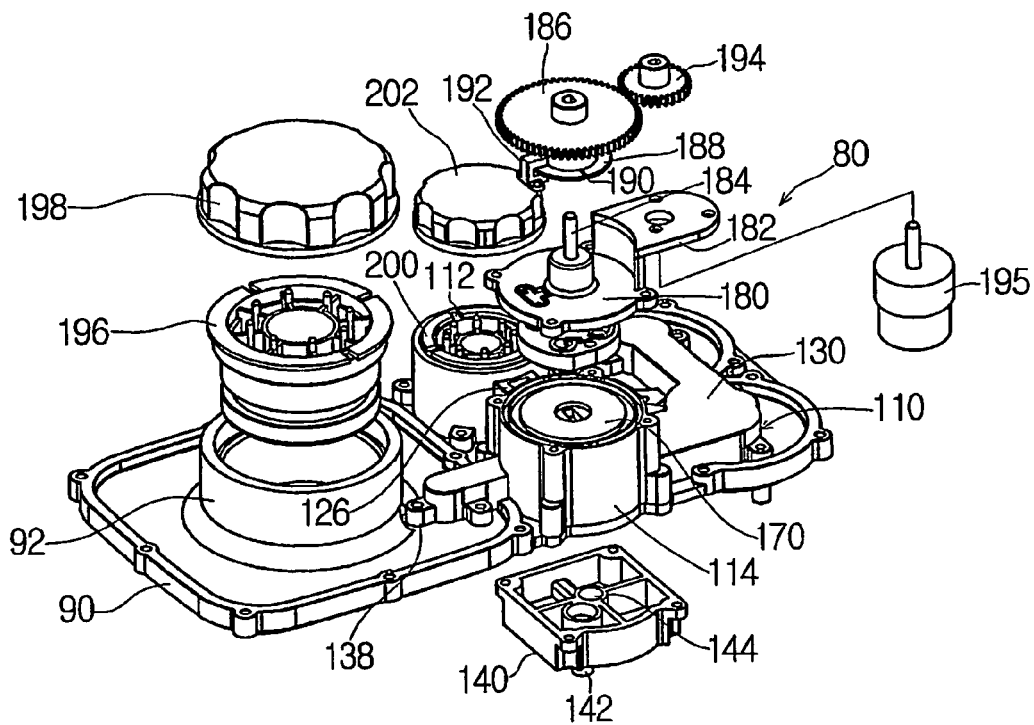
FIG. 21 is an exploded perspective view of a top part of a cold/hot water softener according to the invention.
Figure 22:
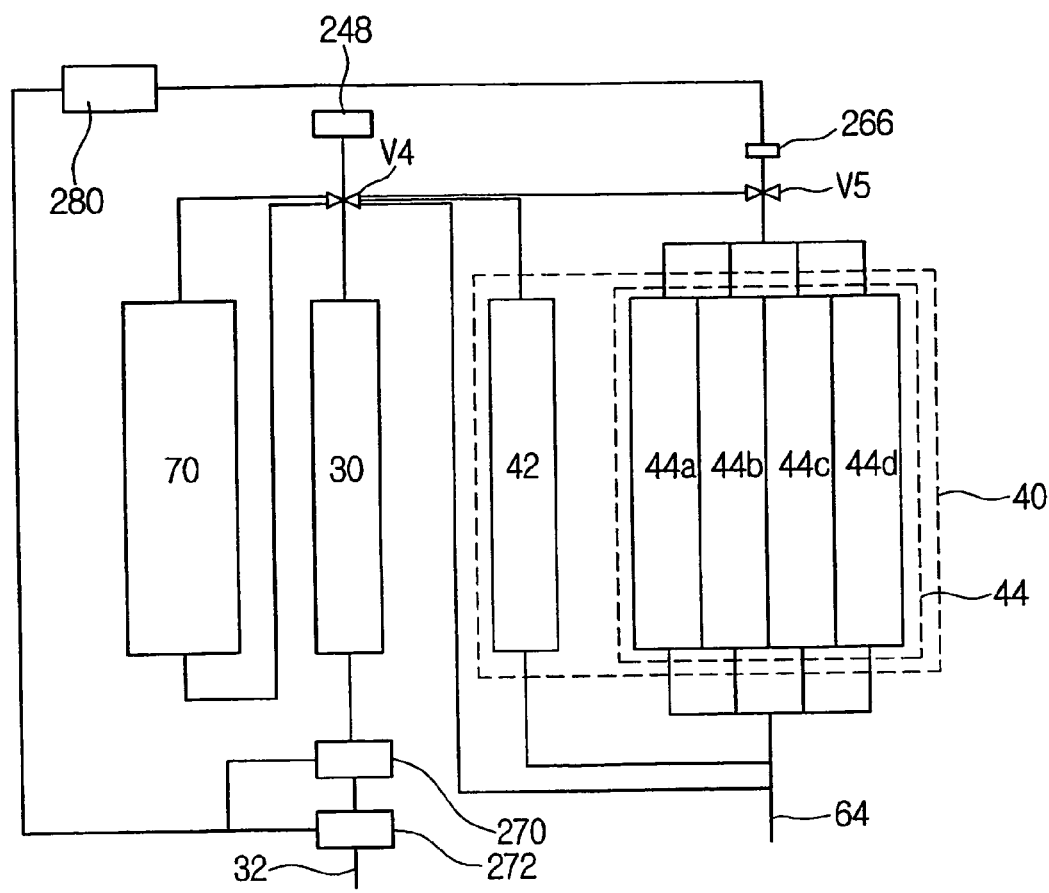
FIG. 22 is a schematic view of another block piping laying diagram.
Figure 23:
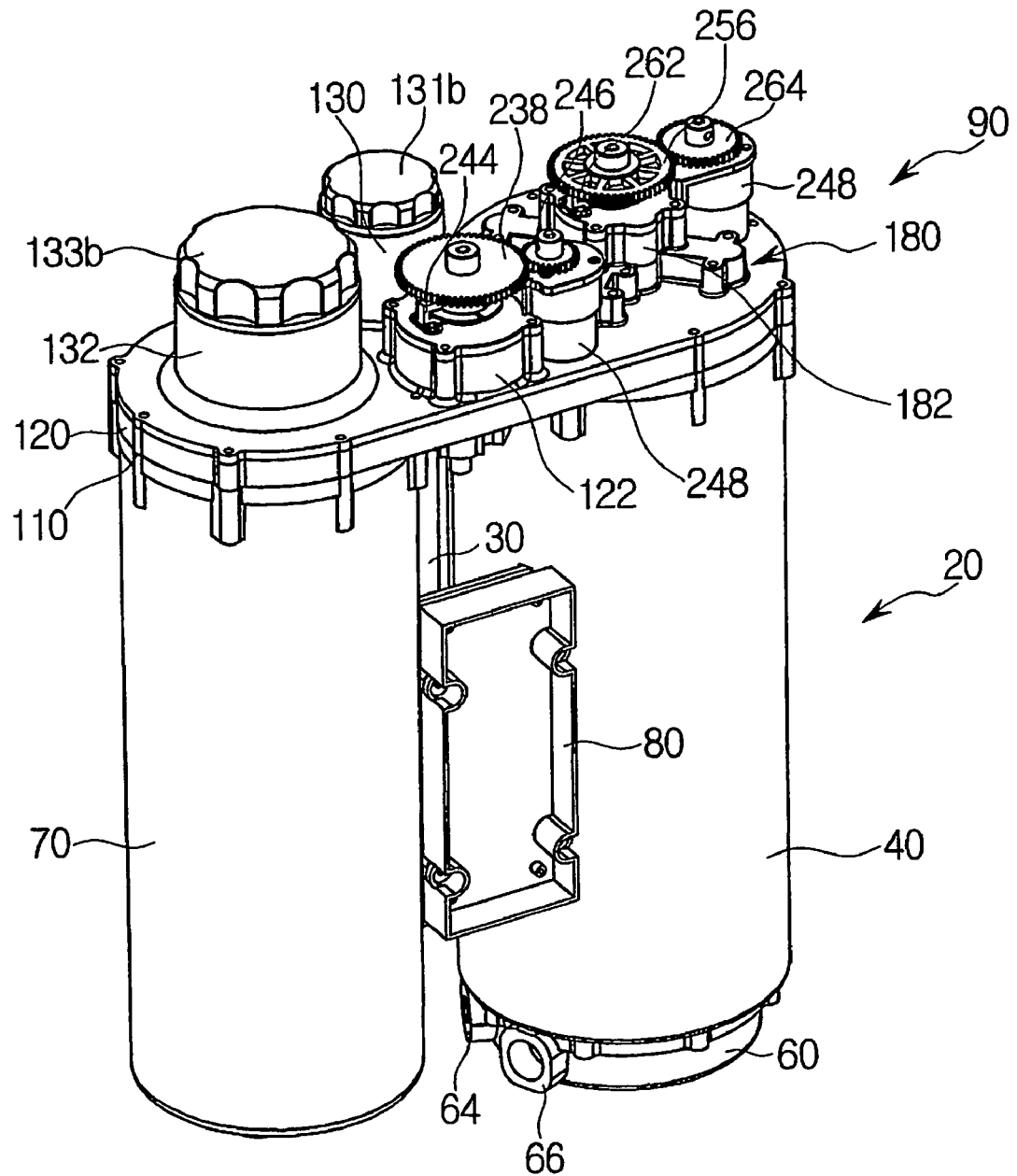
FIG. 23 is a front perspective view of a cold/hot water softener of the present invention.
Figure 24:
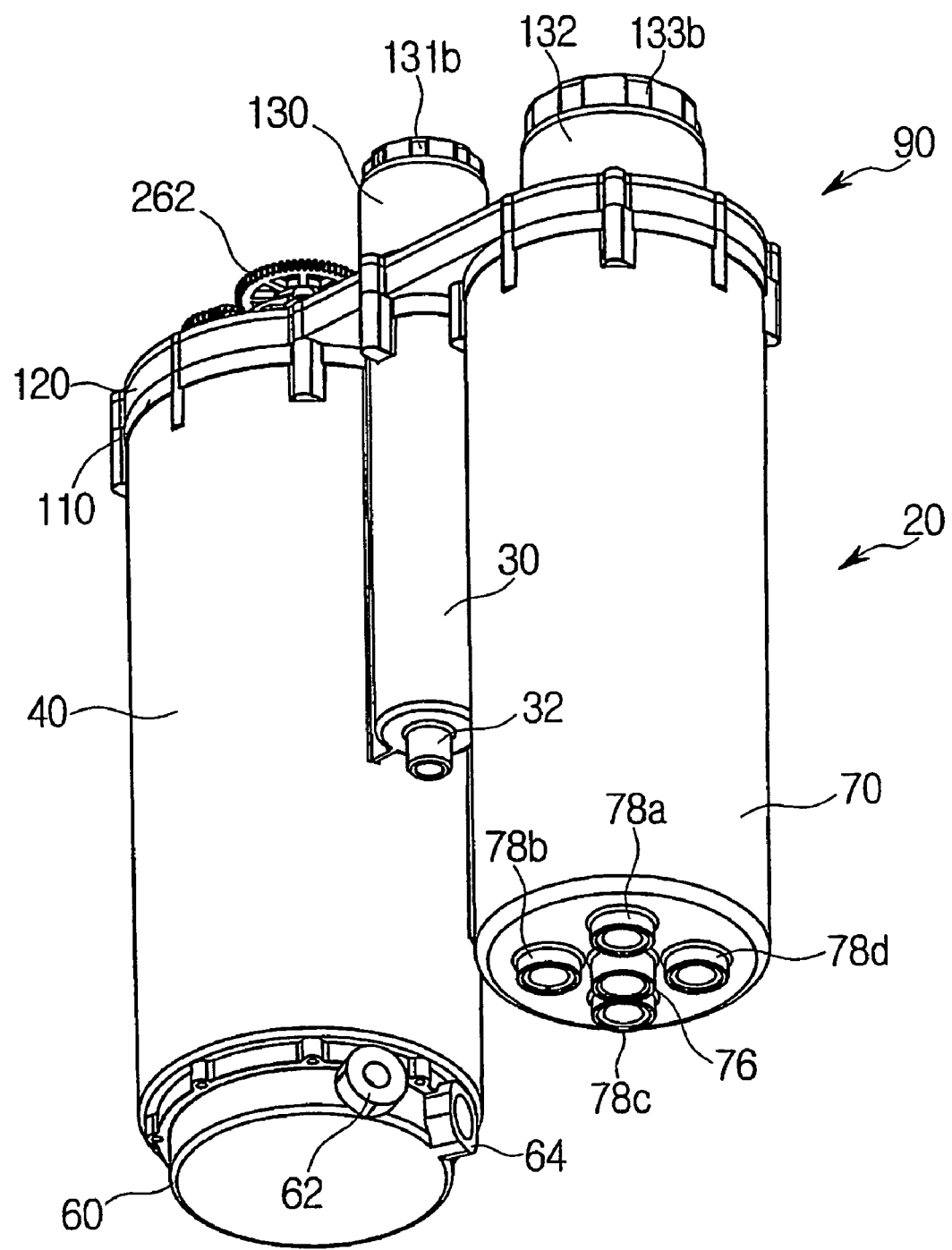
FIG. 24 a rear perspective view of a cold/hot water softener of the present invention.
Figure 25:
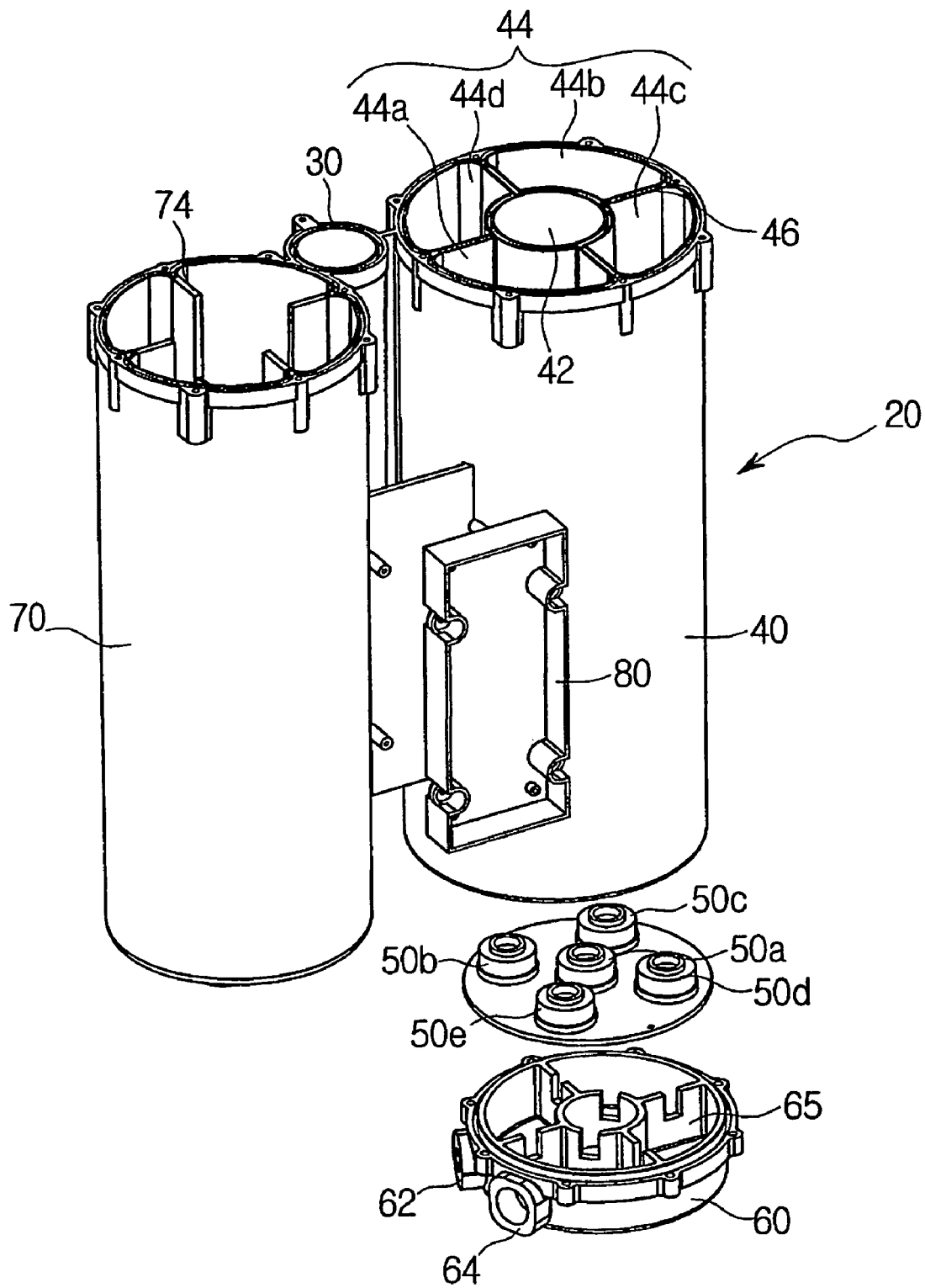
FIG. 25 is an exploded perspective view of a tank part of a cold/hot water softener according to the invention.
Figure 26:
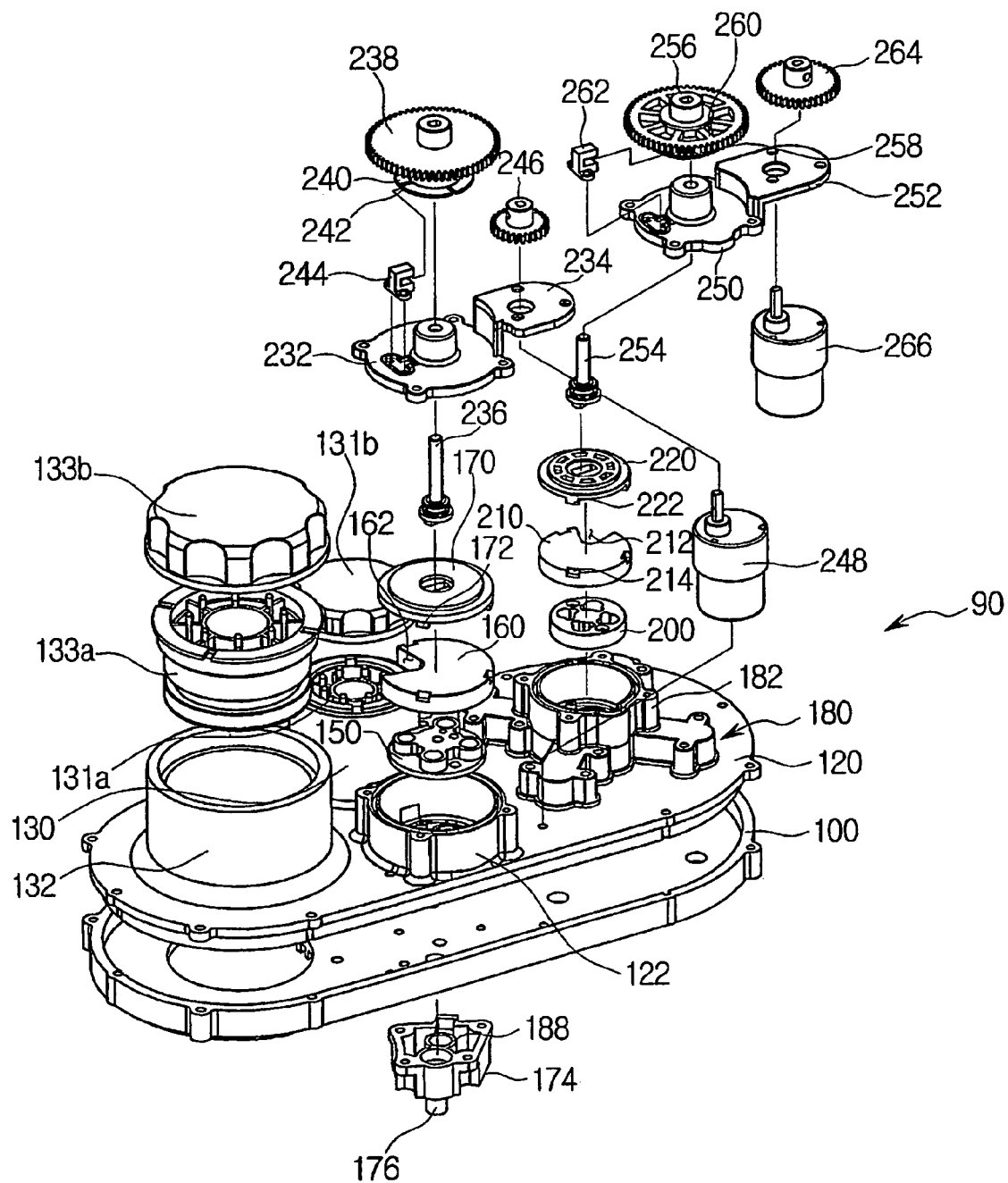
FIG. 26 is an exploded perspective view of a driving part of a cold/hot water softener according to the invention.
Figure 27:
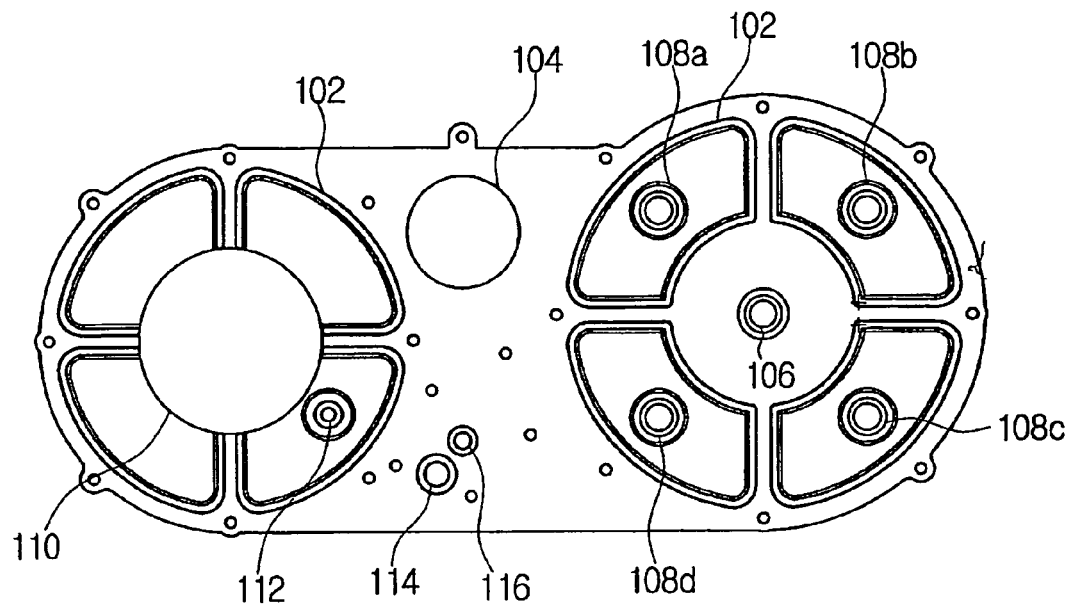
FIG. 27 is a bottom elevation view of a lead plate of a cold/hot water softener according to the invention.
Figure 28:
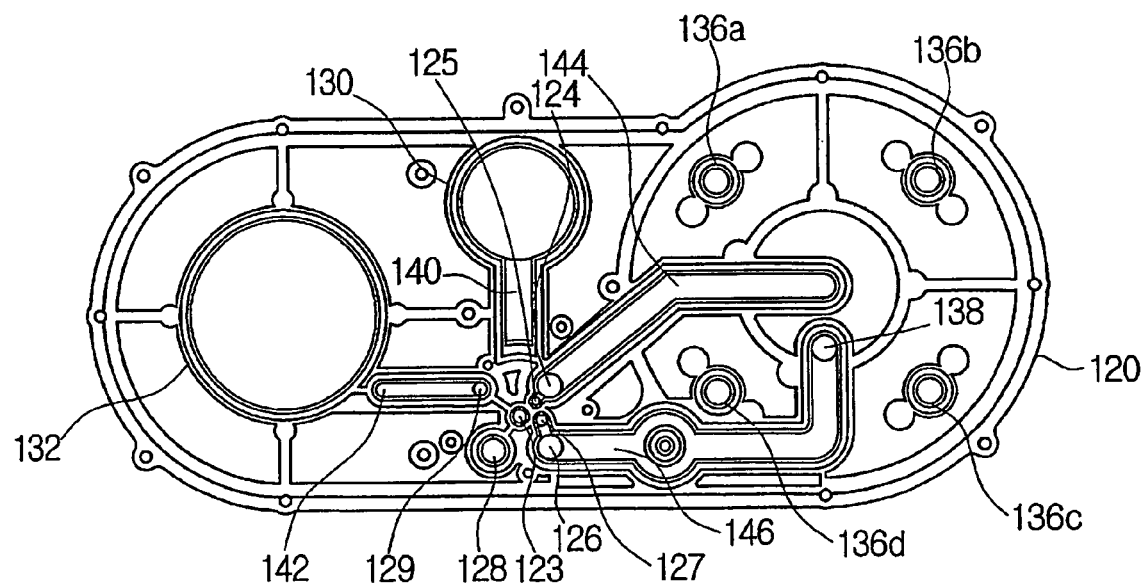
FIG. 28 is a bottom elevation view of a opposite side of the lead plate of a cold/hot water softener according to the invention.
Figure 29:
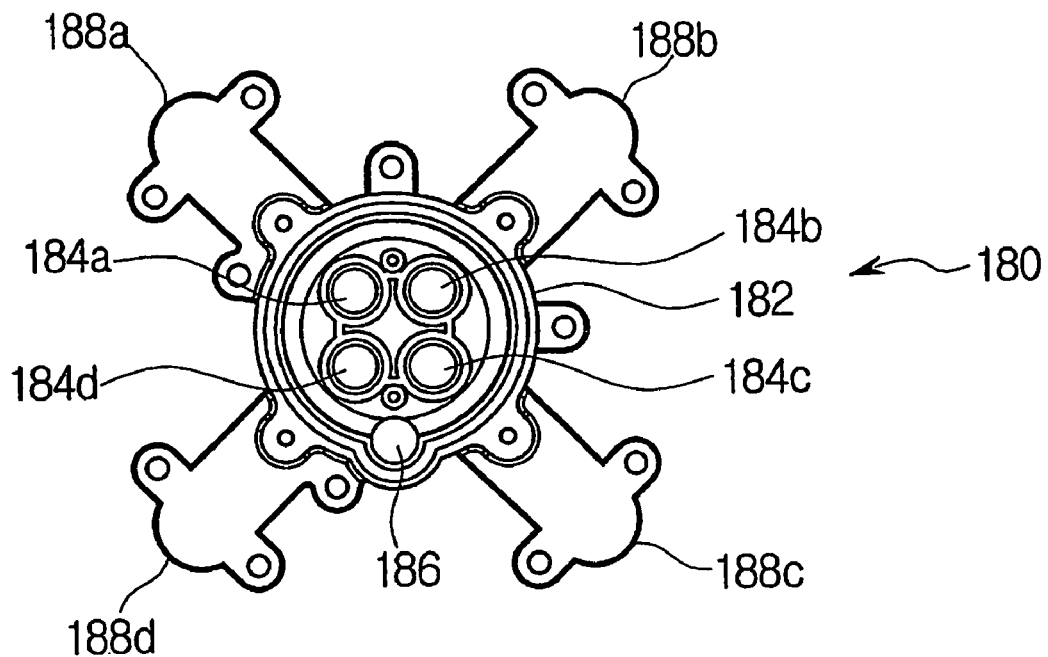
FIG. 29 and FIG. 30 are a top plan view and a bottom elevation view of a passage valve cover of a cold/hot water softener according to the invention, respectively.
Figure 30:
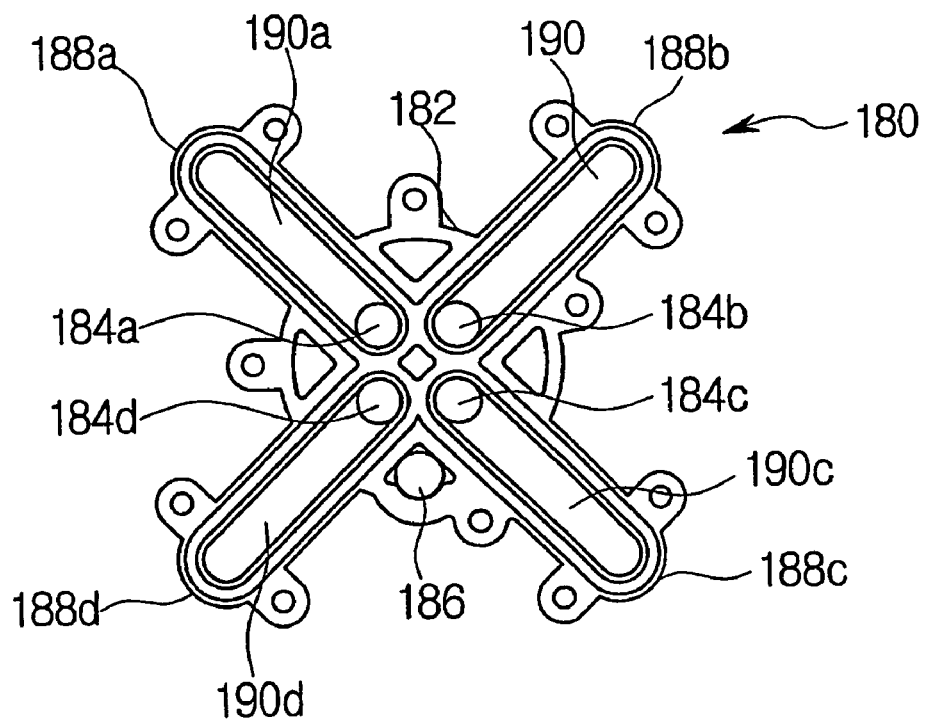

Direct water mode of the invention is illustrated in FIGS. 15 and 16, wherein FIG. 15 shows a sectional view illustrating the cold/hot water softener and FIG. 16 shows a plain view illustrating the operational status of a switching valve 40.

Referring to FIGS. 15 and 16, the connecting opening 46b of the rotary disk 46 exposes the water direct discharging hole 42i in the valve region 34. The raw water which is flown in the valve region 34 through the raw water supply pipe 62 is induced into the water direct discharging pipe 68 through the exposed water direct discharging hole 42i and then is discharged into the water outlet 112 through the water discharging region 36. In this water direct discharging mode, it does not matter even if the flow meter 74 and the temperature sensor 72 are not driven.

D. Intermittence Mode

Although this mode is not illustrated in the drawings, referring to the above drawings and the descriptions thereof, the connecting hole 46b of the rotary disk 46 exposes the closed hole 42l which is obstructed therein. Thus, since the space for passing the raw water supplied from the raw water supply pipe 62 to the valve region 34 is discharged to the outside is not provided, the discharge of fluid to the water outlet 112 and the supply of the raw water to the water inlet 70 are interrupted.

Meanwhile, an automatic regenerable cold/hot water softener according to the invention, as shown in FIGS. 17 to 21, has a direct water mode for directly discharging a cold/hot raw water supplied from the outside using an ion exchange resin and a regenerating substance thereof, a cold/hot water softening mode for discharging a cold/hot soft water, and a regeneration mode for generating a regenerating water in which the regenerating substance is soluble and passing the regenerating water through the ion exchange resin.

The cold/hot water softener comprises a tank part 20, a base plate 90, a valve housing 114 having a ball shape, a regenerating tank stopper 198 and a pre-processing filter tank stopper 202, passages such as a supply passage 128, a cold/hot raw water passages 132 and 134, and a regenerating raw water passage 136, and a switching valve assembly.

The tank part includes: a pre-processing filter tank 309 having filter substance therein, the filter tank 309 having an opened upper side, the filter tank 309 having an water inlet 32 into which the cold/hot raw water is supplied; cold/hot water softening tanks 40 and 50 in which ion exchange resin is filled, the water softening tanks 40 and 50 having regenerating cold/hot soft water outlets 42 and 52 for discharging cold soft water and hot soft water, respectively; and a regenerating tank 60 having a regenerating substance therein, the regenerating tank 60 having a regenerating water discharging hole 64 for discharging regenerating water.

The base plate 90 covers an upper side of the tank part 20 while securing a valve region having a water direct discharging hole 102 and a regenerating water supply hole 104 connected to the regenerating water discharging hole 64. Further, the base plate 90 has a raw water supply hole 96 communicated with the pre-processing filter tank 30, a regenerating tank inlet 92 and a regenerating raw water discharging hole 94 which are communicated with the regenerating tank 60, cold/hot raw discharging holes 98 and 100 communicated with the cold/hot water softening tanks 40 and 50, respectively, and a regenerating water supply hole 104 connected to the regenerating water discharging hole 64.

The valve housing 114 is formed with a cold/hot raw water holes 118 and 120, a regenerating raw water hole 124, a regenerating water hole 116 communicated with the regenerating water supply hole 104, and a direct water hole 122 connected with the direct water discharging hole 102, at a bottom side thereof joined on the valve region.

The regenerating tank stopper 198 closes the regenerating tank inlet 92, and the pre-processing filter tank stopper 202 closes a pre-processing filter tank inlet 112 surrounding an edge of the raw water supply hole 96. The supply passage 128 connects the pre-processing filter tank inlet 112 with a side surface of the valve housing 114. Further, the cold/hot raw water passages connect the cold/hot raw water holes 118 and 120 with the cold/hot raw water discharging hole 98 and 100, respectively. Further, the regenerating raw water passage 136 connects the regenerating raw water hole 124 with the regenerating raw water discharging hole 94. The switching valve assembly is installed in the valve housing 114. In the water direct discharging mode, the switching valve assemble induces a raw water supplied through the supply passage 128 into the direct water hole 122. In the cold/hot water softening mode, it induces the raw water into the cold/hot raw water holes 118 and, 120. In the regeneration mode, it induces the raw water into the regenerating raw water hole 124. Then, it induces the regenerating water supplied to the regenerating water supply hole 104 into the cold/hot raw water holes 118 and 120.

Specifically, the switching valve assembly may include a static disk 150, a rotary disk 160, a cover disk 170 stacked on the rotary disk 160 and rotated together with the rotary disk 160, and a valve cover 180 for closing the switching valve housing 114 in the upper part of the rotary disk 160. Here, the static disk 150 has an inner diameter smaller than the bottom surface, and is fixed on the bottom surface. Further, the static disk 150 is formed with a regenerating water hole 152, a cold/hot raw water holes 154 and 156 communicated with the cold/hot raw water holes 118 and 120, respectively, a direct water hole 158 communicated with the direct water hole 122, and a regenerating raw water hole 159 communicated with the regenerating water hole 124 at a central portion thereof. Further, the static disk 150 is formed with a cold regenerating water inflow groove 154a induced from the cold raw water hole 154 to a center thereof at a predetermined length.

The rotary disk 160 is stacked on the static disk 150 and is rotated on it. According to this rotation, in the cold/hot water softening mode, it opens each of the cold/hot raw water holes 154 and 156, and, in the water direct discharging mode, it opens the direct water hole 158. Further, in the regeneration mode, the rotary disk 160 opens the regenerating raw water hole 159. To do this, the rotary disk 160 is formed with an opening and closing hole 162 induced from one side thereof, a trap groove 154a formed therewithin for opening the regenerating water hole 152, and cold/hot regenerating water distribution grooves 166 and 168 branched off from the trap groove and connected with cold regenerating water hole inflow groove 154a and the hot raw water hole 156, respectively, at a bottom surface thereof.

Meanwhile, an automatic regenerable cold/hot water softener for subdividing a temperature according to the invention, as shown in FIGS. 22 to 30, has a cold/hot water softening mode for changing cold/hot raw water into cold/hot soft water using ion exchange resin and regenerating substance thereof and discharging the cold/hot soft water, a direct water mode for directly discharging raw water, and a regeneration mode for regenerating the ion exchange resin. The cold/hot water softener comprises a pre-processing filter tank 30, a water softening tank, a regenerating tank, a first switching valve V4, a second switching valve V5, and a control part 280. Here, the pre-processing filter tank 30 has a water inlet 32 provided with a flow meter 270 and a temperature sensor 272.

The water softening tank includes: a cold water softening part 42 having the ion exchange resin therein and a cold soft water outlet 43; and a hot water softening part 44 divided by at least two regions 44a, 44b, 44c and 44d for softening raw water having different temperature, the regions having hot soft water outlet 45a, 45b, 45c and 45d, respectively.

The regenerating tank 70 has the regenerating substance therein and a regenerating water discharging hole 76. The first switching valve V4 supplies a raw water within the pre-processing filter tank 30 to the cold water softening part 42 in the cold water softening mode. Further, in the water direct discharging mode, it discharges the raw water to the outside. Further, in the regenerating mode, it supplies the raw water to the regenerating tank 70 and then supplies the regenerating water discharged from the regenerating water outlet 76 to the cold water softening part 42. The second switching valve V5, in the hot water softening mode, is supplied with the raw water within the pre-processing filter tank 30 from the first switching valve V4 and then supplies the raw water to any one selected from the at least two regions 44a, 44b, 44c and 44d of the hot water softening part 44. Further, in the regeneration mode, it is supplied with regenerating water from first switching valve V4 and then supplies the regenerating water to at least one region selected from the at least two regions 44a, 44b, 44c and 44d of the hot water softening part 44.

The control part 280 controls the operations of the first and second switching valves V4 and V5 based on the result sensed by the flow meter 270 and the temperature sensor 272 to control each of the modes. Thus, the cold/hot water softener of the invention supplies hot raw water having different temperature to the at least two regions 44a, 44b, 44c and 44d, thereby discharging hot soft water having subdivided temperature. Further, it prosecutes the regeneration mode based on the inflow amount of the raw water.

Specifically, the regenerating water discharging hole 76 is positioned at a center of a bottom surface of the regenerating tank 70. The inside of the regenerating tank 70 is partitioned by a regenerating tank partition 74 installed along the direction of length and forms first to fourth sections 72a, 72b, 72c and 72d arranged in a shape of a concentric circle. The regenerating tank partition 74 is formed with embayment portions at a center of an upper end thereof and at a center of a lower end thereof, respectively, which is communicated each other, so that all of the first to fourth sections 72a, 72b, 72c and 72d are communicated with the regenerating water discharging hole 76.

Further, the regenerating tank 70 has first to fourth salt discharging holes 78a, 78b, 78c and 78d which pass through the bottom surfaces of the first to fourth sections 72a, 72b, 72c and 72d and are opened and closed by stoppers, respectively. Further, the regenerating tank 40 is partitioned by a regenerating tank partition 46 installed along the direction of length and forms a central cold water softening part 42 and a hot water softening part 44 which surrounds the central cold water softening part 42 and has first to fourth regions 72a, 72b, 72c and 72d. Further, in the regenerating tank 70, first to fifth check valves 50a, 50b, 50c, 50d and 50e are installed within the cold raw water outlet 43 and the hot raw water outlets 45a, 45b, 45c and 45d, respectively.

Especially, the pre-processing filter tank 30, the water softening tank 40 and the regenerating tank 70 have opened upper sides, respectively. The above cold/hot water softener further comprises a base plate 100, a lead plate 110, passages such as a raw water supply passage 140, a cold raw water passage 144, a hot raw water passage 146, a regenerating raw water passage 142, a first switching valve unit, a valve passage cover 180, and a second switching valve unit.

The base plate 100 covers the upper sides of the pre-processing filter tank 30, the water softening tank 40 and the regenerating tank 70 while securing a first switching valve region having a water direct discharging hole 114 and a regenerating water supply hole 116 connected to the regenerating water discharging hole 76. Further, the base plate 100 has a filter inlet 104 communicated with the pre-processing filter tank 30, a cold raw discharging holes 106 communicated with the cold water softening part 42, first to fourth hot raw water discharging holes 108a, 108b, 108c and 108d communicated with the first to fourth regions 44a, 44b, 44c and 44d, respectively, a regenerating tank inlet hole 110 communicated with the regenerating tank 70, and a regenerating raw water hole 112.

The lead plate 110 has a filter tank inlet 130 extending the filter inlet hole 104 and a regenerating tank inlet 132 extending the regenerating tank inlet hole 110. Further, the lead plate 110 is stacked on the base plate 100 while having a ball shaped first switching valve housing 122 which is formed with a cold raw water hole 124, a cold regenerating water hole 125, a hot raw water hole 126, a hot regenerating water hole 127, a regenerating raw water hole 129, a direct water hole 128 communicated with the direct water discharging hole 114, and a regenerating water hole 123 communicated with the regenerating water supply hole 116, at a bottom surface thereof corresponding to the first switching valve region. Further, the lead plate 110 has first to fourth hot raw water discharging holes 136a, 136b, 136c and 136d communicated with the first to fourth hot raw water discharging holes 108a, 108b, 108c and 108d, respectively, while securing a second switching valve region having a hot raw water supply hole 130 which is passed through toward a part corresponded to the regenerating tank 40.

The raw water supply passage 140 is arranged between the base plate 100 and the lead plate 110, and connects the filter tank inlet 130 with a side surface of the first switching valve housing 122. The cold raw water passage 144 connects the cold raw water discharging hole 106 with the cold raw water hole 124 and the cold regenerating water hole 125. The hot raw water passage 146 connects the hot raw water supply hole 138 with the hot raw water hole 126 and the hot regenerating water hole 127. The regenerating raw water hole 129 connects the regenerating raw water hole 129 with the regenerating raw water discharging hole 112. The first switching valve unit is mounted in the first switching valve housing 122. The valve passage cover 180 has first to fourth distribution passage pipes 188a, 188b, 188c and 188d formed with first to fourth hot raw water distribution passages 190a, 190b, 190c and 190d having a groove shape at a bottom surface thereof to be connected with the first to fourth distribution holes 184a, 184b, 184c and 184d and the first to fourth hot water discharging holes 136a, 136b, 136c and 136d, respectively, which are branched off from a side surface of a ball shaped second switching valve housing 182 having a hot raw water supply hole 186 communicated with the hot raw water supply hole 138. The second switching valve unit is mounted within the second switching valve housing 182.

Further, the regenerating water hole 123 is positioned at a center of the first switching valve housing 122, and the cold raw water hole 124, the hot raw water hole 126, the direct water hole 128, and the regenerating raw water hole 129 are arranged in turn to surround the regenerating water hole 123. The cold regenerating water hole 125 is positioned between the cold raw water hole 124 and the regenerating water hole 123, and the hot regenerating water hole 127 is positioned between the hot raw water hole 126, the cold raw water hole 124 and the regenerating water hole 123. The hot raw water supply hole 186 is eccentrically positioned on the second switching valve housing 182. The first to fourth distribution holes 184a, 184b, 184c and 184d are arranged in a shape of a concentric circle from a center of a bottom surface of the second switching valve housing 182.

The first switching valve unit comprises a first static disk 150 fixed on the bottom surface of the first switching valve housing 122, a first rotary disk 160 which is staked on the first static disk 150 and is rotated with its center corresponding with a center of the first static disk, and a first cover disk 170 which is stacked on the first rotary disk 160 and is rotated together with the first rotary disk 160, the first cover disk 170 closing the first switching valve housing 122. Here, the first static disk 150 has a regenerating water hole 151 communicated with the regenerating water hole 123, a cold raw water hole 152 and a cold regenerating water hole 153 which are communicated with the cold raw water hole 124 and the cold regenerating water hole 125, respectively, a hot raw water hole 154 and a hot regenerating water hole 155 which are communicated with the hot raw water hole 126 and the hot regenerating water hole 127, respectively, a direct water hole 156 communicated with the direct water hole 128, and are generating raw water hole 157 communicated with the regenerating raw water hole 112.

The first rotary disk 160 has a first opening 162 induced from a side surface thereof to open one of selected from the cold raw water hole 152, the hot raw water hole 154, the direct water hole 156 and the regenerating raw water hole 157 in each of the modes, a trap groove 163 induced to extend the regenerating water hole 151 to the inside thereof, and an extended groove 164 which is extended from the trap groove to one side thereof and is communicated with cold regenerating water hole 153 or the hot regenerating water hole 155 in the regeneration mode.

Further, the second switching valve unit comprises: a second static disk 200 having first to fourth connecting holes 202a, 202b, 202c, and 202d communicated with the first to fourth distribution holes 184a, 184b, 184c and 184d, respectively, the second static disk 200 being fixed on the bottom surface of the second switching valve housing 182; a second rotary disk 210 which is stacked on the second static disk 200 and is rotated with its center being corresponded with a center of the second static disk 200, the second rotary disk 210 being formed with a second opening 212 induced from a side surface thereof to open one selected from the first to fourth connecting holes 202a, 202b, 202c and 202d in the hot water softening mode or the regeneration mode; and a second cover disk 220 which is staked on the second rotary disk 210 and is rotated together with the second rotary disk 210, the second cover disk 220 closing the second switching valve housing 182. The second switching valve unit further comprises a stepped groove 204 for extending upper ends of the first to fourth connecting holes 202a, 202b, 202c and 202d to adjacent side direction thereof.

The cold/hot water softener of the invention further comprises: a first switching valve cover 232 for covering and closing the first switching valve housing 122; a first guide step 234 projected toward side direction to form a step from the first switching valve cover 232; a first rotation shaft 236 which passes through the first switching valve cover 232, one end thereof being fixed in a center of the first cover disk 170; a first switching valve gear 238 fixed to the other end of the first rotation shaft 236; a first motor gear 236 fixed on the first guide step 234, the first motor gear 236 being engaged with the first switching valve gear 238; a first motor 248 for rotating the first motor gear 246; a second switching valve cover 250 for covering and closing the second switching valve housing 182; a second guide step 252 projected toward side direction to form a step from the second switching valve cover 250; a second rotation shaft 254 which passes through the second switching valve cover 250, one end thereof being fixed in a center of the second cover disk 220; a second switching valve gear 256 fixed to the other end of the second rotation shaft 254; a second motor gear 264 fixed on the second guide step 252, the second motor gear 264 being engaged with the second switching valve gear 256; and a second motor 266 for rotating the second motor gear 264. The control part 280 adjusts each of the modes by controlling rotating direction and angle of the first and second motors 248 and 266.

The cold/hot water softener of the invention further comprises: a first slit disk 240 having numerous first slits 242, the first slit disk 240 surrounding the external surface of the first rotation shaft 246 to be rotated together with the first rotation shaft 236 between the first switching valve gear 238 and the first switching valve cover 232; a first optical sensor 244 which is overlapped on the first slit disk 240 to sense movement of the first slit 242; a second slit disk 260 having numerous second slits 258, the second slit disk 260 surrounding the external surface of the second rotation shaft 254 to be rotated together with the second rotation shaft 254 between the second switching valve gear 256 and the second switching valve cover 250; and a second optical sensor 262 which is overlapped on the second slit disk 260 to sense movement of the first slit 258. The control part 280 adjusts rotating direction and angle of the first and second motor 248 and 266 based on the result sensed by the first and second optical sensors 244 and 262.

The cold/hot water softener of the invention further comprises; a switching valve cup 174 joined to a bottom surface of the base plate 100 to correspond to first switching valve region, the switching valve cup having a direct water discharging hole 176 for extending the direct water discharging hole 114 to a lower end thereof, and a regenerating water supply hole 188 for extending the regenerating water supply hole 116 to a lower end thereof; a discharging cup 60 joined to a bottom surface of the water softening tank 40, the discharging cup 60 surrounding the cold soft water outlet 43 and the hot soft water outlets 45*a*, 45*b*, 45*c* and 45*d* to join them, the discharging cup 60 being formed with a water outlet 64 and a direct discharging supply hole 62 at a side surface thereof; and pipes for connecting the direct water discharging hole 176 with the direct water supply hole 62 and for connecting the regenerating water supply hole 188 with the regenerating water discharging hole 76.

The cold/hot water softener of the invention further comprises: a reinforcement rib 65 which is projected to communicate the inside of the discharging cup 60 with the water outlet 64 and the direct water supply hole 62; a first guide rib 102 which is projected at a predetermine height on a bottom surface of the base plate 100 to guide an edge of an upper side of a respective one of the pre-processing filter tank 30, a water softening tank 40 and a regenerating tank 70 and press them without a gap; and a second guide rib 134 which is projected at a predetermined height on an upper surface of the lead plate 110 to guide an edge of an end of a bottom side of the valve passage cover 180 and press it without a gap.

INDUSTRIAL APPLICABILITY

As described above, according to the automatic regenerable cold/hot water softener, precise regeneration time of the ion exchange resin can be judged according to the used amount of soft water, and, in particular, the ion exchange resin can be automatically regenerated at proper time not to require a user's special manipulation. Thus, the problem in the prior art that several valves should be operated directly by hand of the user every time is dissolved. Further, it is convenient in that the regeneration is performed in the intermittence mode that the user does not use the water softener.

Further, according to the cold/hot water softener of the invention, all of the operation modes of the water softener are controlled by one switching valve. Thus, since the structure thereof is simple and the water softener is simply manipulated, the possibility of failure or malfunction of the water softener can be considerably decreased, and production cost can be saved. Further, since the cold/hot water softener prevents sudden change of temperature of cold/hot water, a children those who are not a skilled person can be safely use.

Further, since the cold/hot water softener of the invention allows a user to use cold soft water or hot soft water according to the subdivided temperature, it serves a user's convenience. Further, since the cold/hot water softener of the invention has a simple structure by minimizing the number of the switching valve contrary to the conventional water softener, the possibility of failure or malfunction of the water softener can be considerably decreased. Thereby, the cold/hot water softener of the invention can be installed even in a small space.

I claim:

1. An automatic regenerable cold/hot water softener apparatus comprising:

a water softening tank including at least two softening water regions formed along the vertical direction of a length of said water softening tank so as to partition radially an inside of a cylindrical body, the water softening regions being filled with an ion exchange resin, said water softening tank having a valve region formed in an upper end thereof so as to join the water softening regions to each other, said water softening tank having a water outlet region formed in a lower end thereof so as to join the water softening regions;

a regenerating tank filled with a regenerating substance, said regenerating tank having a regenerating tank stopper suitable for opening an inside thereof;

a raw water supply pipe connected to said valve region so as to supply raw water to said valve region;

a regenerating raw water pipe and a regenerating water pipe connected to an upper end and a lower end of the regenerating tank, respectively;

a direct water pipe connected to said valve region and to said water outlet region;

a temperature sensor means cooperative with said raw water supply pipe, said temperature sensor means for sensing temperature of the raw water;

a flow meter means for finding the cumulative total of the supply amount of the raw water, said flow meter means cooperative with said raw water supply pipe;

a switching valve means positioned in said valve region for supplying raw water to one of the water softening regions in a water softening mode, said switching valve means for inducing raw water into said regenerating raw water pipe and then supplying regenerating water collected from said regenerating water pipe to each of the water softening regions in a regeneration mode, said switching valve means for inducing raw water into said direct water pipe in a direct water mode, said switching valve means for shutting off said raw water supply pipe in an intermittent mode;

a valve driving means cooperative with said switching valve means for controlling an operation of said switching valve means; and a controlling means for distributing the raw water into each of the water softening regions according to a temperature in the water softening mode based on a measured result of the temperature sensor means, said controlling means for controlling the valve driving means so as to change the intermittent mode into the regeneration mode based on the cumulative total of the flow meter means.

2. The apparatus of claim 1, further comprising: a pre-processing filter installed in said raw water supply pipe so as to filter the raw water.

3. The apparatus of claim 1, further comprising: a pre-processing filter installed in said raw water pipe so as to absorb contaminants from the raw water, said pre-processing filter having activated carbon therein.

4. The apparatus of claim 1, said switching valve means comprising:
- a static disk fixed to close an upper end of each of the water softening regions, said static disk including soft water holes and regenerating water distribution holes communicating with the water softening regions, said static disc having a regenerating raw water hole communicating said regenerating raw water pipe, and said static disc having a direct water hole communicating said direct water pipe; and
- a rotary disk positioned on the static disk, said rotary disk rotatable about a center axis projected upwardly, said rotary disk being rotatable to a first position so as to have a connecting opening exposing one of the soft water holes to the valve region in the water softening mode, said rotatable disk being rotatable to a second position so as to expose said regenerating raw water hole to the valve region and interconnecting said regenerating water hole and said regenerating water distribution holes by a trap groove in the regeneration mode, said rotatable disk being rotatable to a third position so as to expose said direct water hole to said valve region in the direct water mode, said rotatable disk being rotatable to a fourth position so as to expose said closed hole to said valve region in the intermittent mode.

5. The apparatus of claim 4, wherein said regenerating water hole is positioned eccentrically from a center of said static disk, said regenerating water distribution holes being arranged along edges of said regenerating water hole, each of said soft water holes and said direct water hole and said regenerating raw water hole and said closed hole being arranged radially in turn along said edges of said static disk and being maintained at equal distances from a center of said static disk.

6. The apparatus of claim 4, wherein said raw water supply pipe is connected to a side of said valve region, said regenerating water pipe extending from a lower end of the regenerating tank and passed through a side of a lower end of the softening tank and connected to a lower surface of said static disk, said direct water pipe extending from said lower surface of the static disk and connected to said water outlet region.

7. The apparatus of claim 4, further comprising: an enlarged groove at an upper end of the soft water holes adjacent to adjacent soft water holes.

8. The apparatus of claim 4, said wherein the valve driving means comprises:
- a rotation shaft;
- a motor gear fixed to said rotation shaft, said motor gear having a center penetrated by said rotation shaft;
- a main gear engaged with said motor gear, said main gear having a center penetrated and fixed by a center axis of said rotary disk; and
- a position plate having a plurality of discrimination marks along an edge thereof, said position plate having a center penetrated by said center axis of said rotary disk.

9. The apparatus of claim 4, said controlling means comprising:
- a position detecting sensor means cooperative with said rotary disk for finding the degree of rotation of the rotary disk; and
- a logical operation means cooperative with said valve driving means for controlling rotating direction and an angle of a rotation shaft of said valve driving means based on said position sensing means, said temperature sensing means and said flow meter means.

10. The apparatus of claim 1, further comprising:
- a water level detecting sensor means positioned in said regenerating tank for sensing a level of the regenerating water within said regenerating tank; and
- a discharging valve extending through a bottom surface of said regenerating tank, said discharging valve being openable and closable by the water lever detecting sensor means so as to constantly maintain a level of the regenerating water in said regenerating tank.

* * * * *